United States Patent
Kim et al.

(10) Patent No.: US 9,262,605 B2
(45) Date of Patent: Feb. 16, 2016

(54) MOBILE TERMINAL AND CONTROL METHOD FOR THE SAME

(75) Inventors: Hyungjung Kim, Seoul (KR); Yeonho Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 333 days.

(21) Appl. No.: 13/571,834

(22) Filed: Aug. 10, 2012

(65) Prior Publication Data

US 2013/0065648 A1    Mar. 14, 2013

(30) Foreign Application Priority Data

Sep. 8, 2011  (KR) .................. 10-2011-0091449
Jun. 18, 2012  (KR) .................. 10-2012-0065154

(51) Int. Cl.
*H04B 1/38* (2015.01)
*G06F 21/31* (2013.01)
*G06F 21/32* (2013.01)
*G06F 21/60* (2013.01)

(52) U.S. Cl.
CPC ............... *G06F 21/31* (2013.01); *G06F 21/32* (2013.01); *G06F 21/606* (2013.01)

(58) Field of Classification Search
CPC ... G06F 3/017; G06F 1/1694; H04M 1/72519
USPC .......................................... 455/440, 411, 552
See application file for complete search history.

(56) References Cited

U.S. PATENT DOCUMENTS

| | | | |
|---|---|---|---|
| 2001/0046850 A1* | 11/2001 | Blanke et al. ............... | 455/411 |
| 2004/0192399 A1* | 9/2004 | DeCost et al. ............... | 455/566 |
| 2006/0052109 A1* | 3/2006 | Ashman et al. .............. | 455/440 |
| 2010/0128571 A1* | 5/2010 | Roh et al. .................... | 368/11 |
| 2012/0045994 A1* | 2/2012 | Koh et al. .................... | 455/41.3 |
| 2014/0228077 A1* | 8/2014 | Xu ................................ | 455/566 |

OTHER PUBLICATIONS

Vili Lehdonvirta et al: "UbiPay: Minimizing Transaction Costs with Smart Mobile Payments", Sep. 4, 2009, pp. 1-7, XP008156382, Retrieved from the Internet: URL:http://www.hut.fi/-vlehdonv/documents/Lehdonvirta_2009_UbiPay_Mobility.pdf.
European Search Report dated Dec. 14, 2012.

* cited by examiner

*Primary Examiner* — Wesley Kim
*Assistant Examiner* — Richard Chan
(74) *Attorney, Agent, or Firm* — Ked & Associates, LLP

(57) ABSTRACT

A mobile terminal is disclosed herein. The mobile terminal may include a body, a display, a transceiver for short range radio communication, and a controller configured to control data transfer through the transceiver. The controller may be configured to determine whether a request for data is received, determine whether an input is required to allow authorize the data transfer, and determine whether the data transfer is authorized, and transfer data through the transceiver when the data transfer is authorized. The input may be received without displaying a prompt on the display for the input. The input may be received while the display is turned off. Moreover, the input may be a prescribed movement of the body of the mobile terminal or an application of a prescribed amount of force on the mobile terminal.

14 Claims, 23 Drawing Sheets

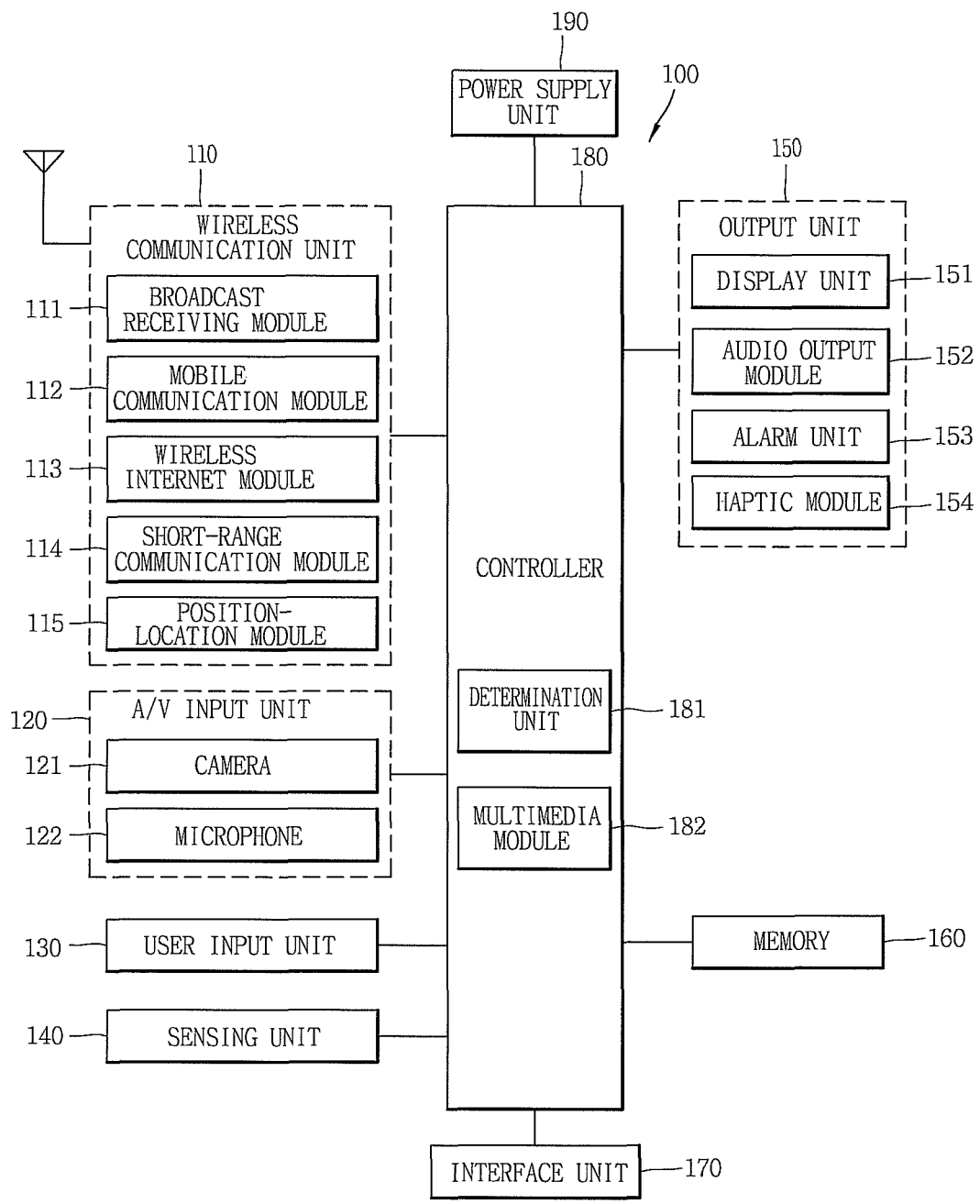

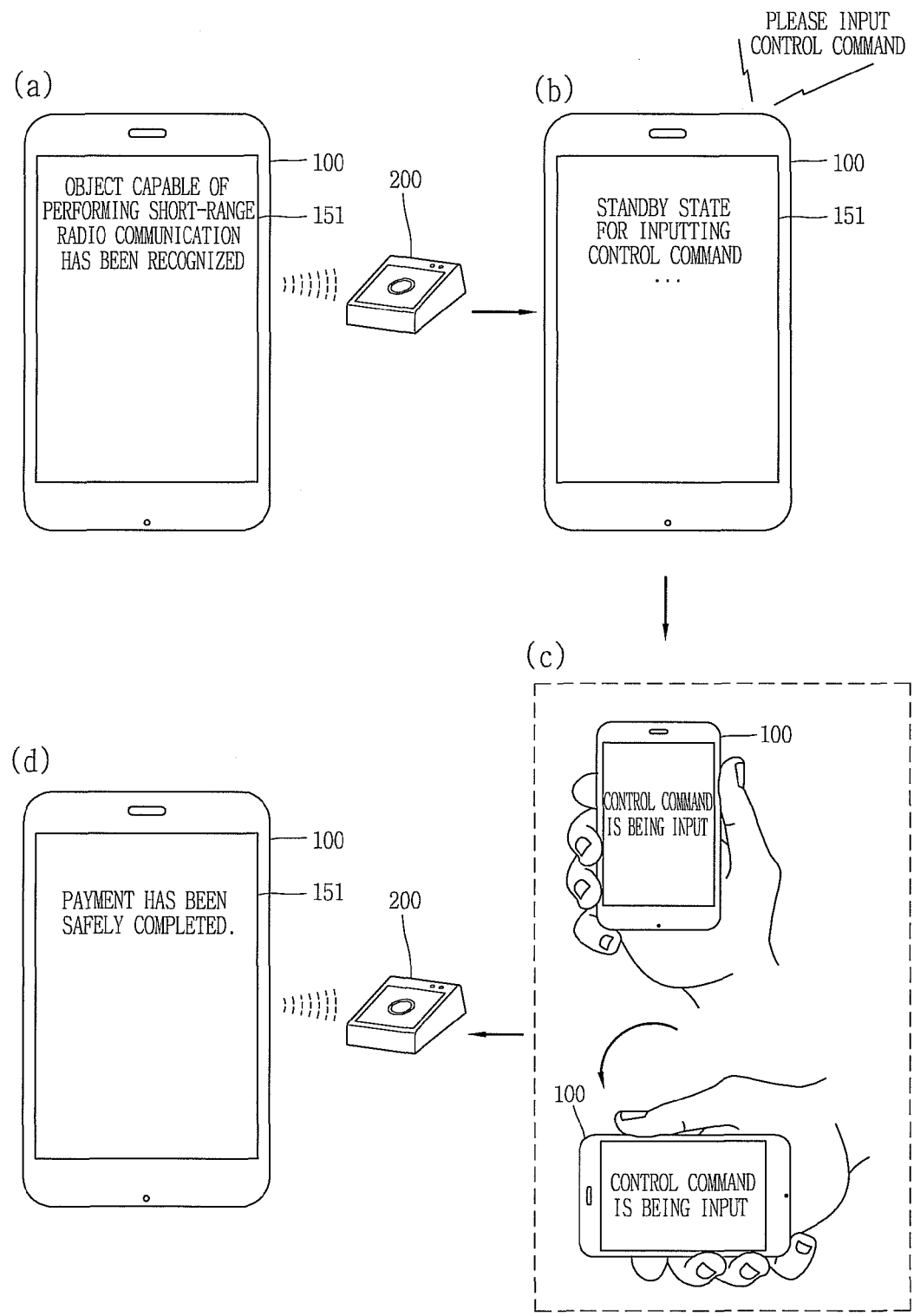

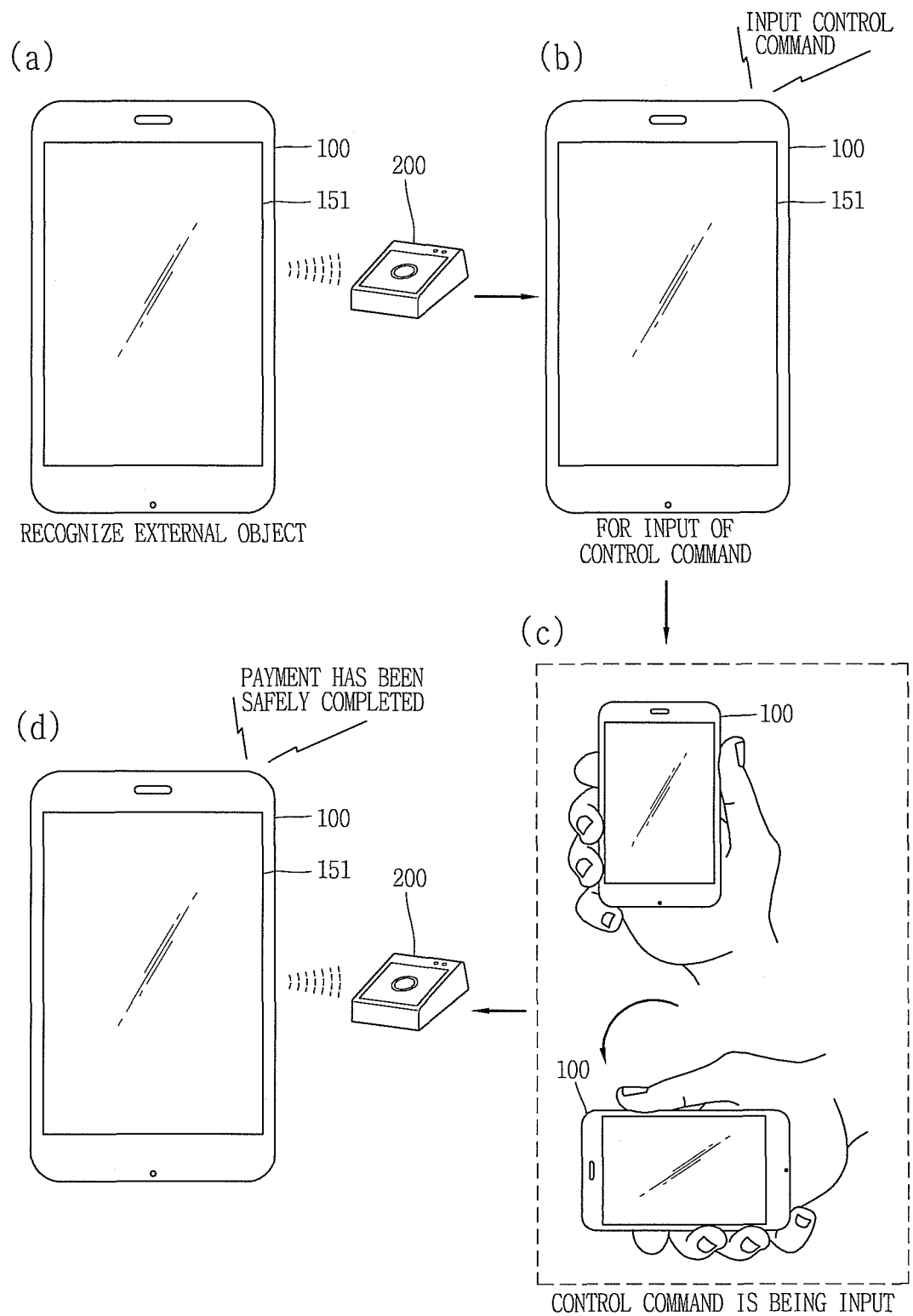

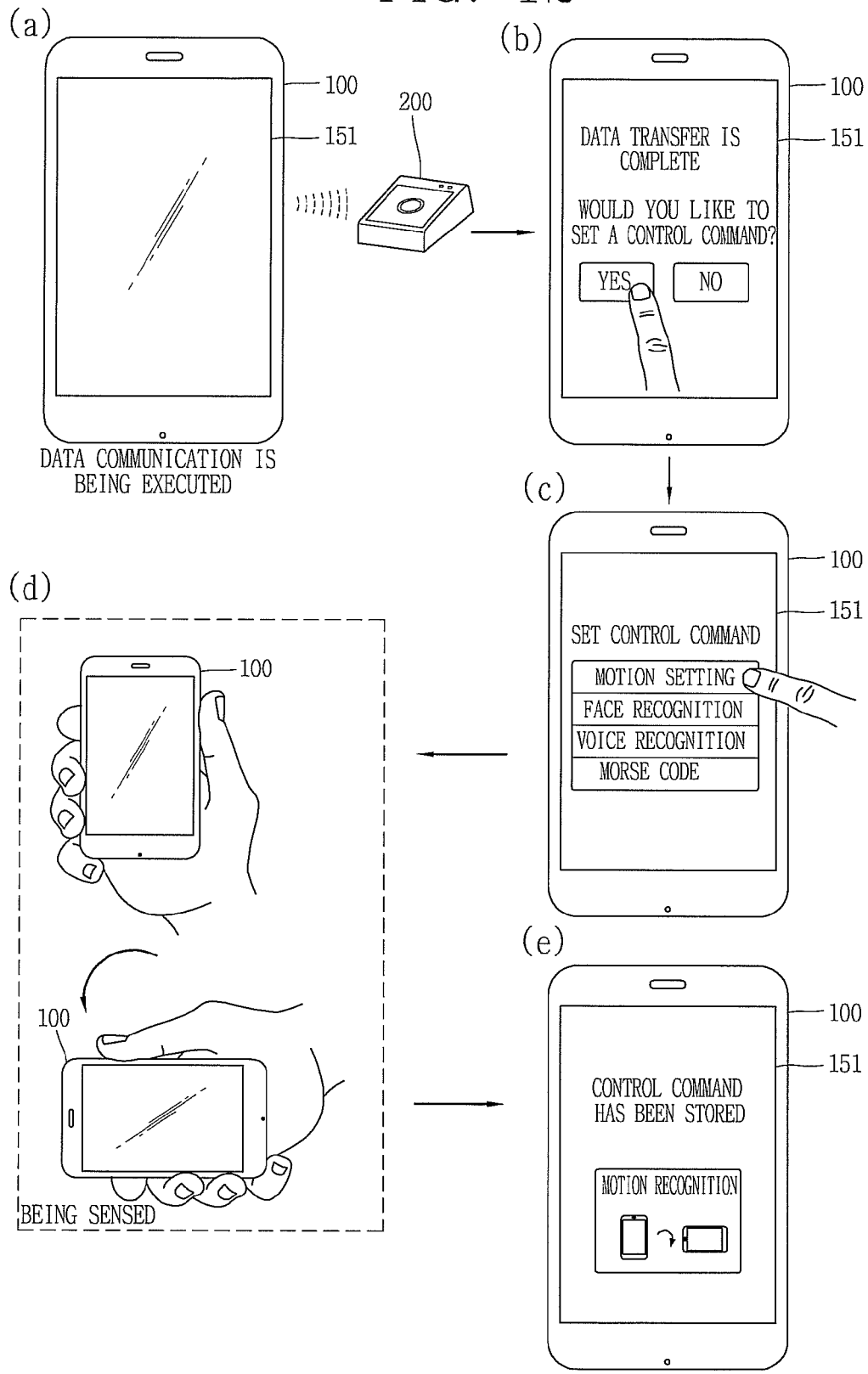

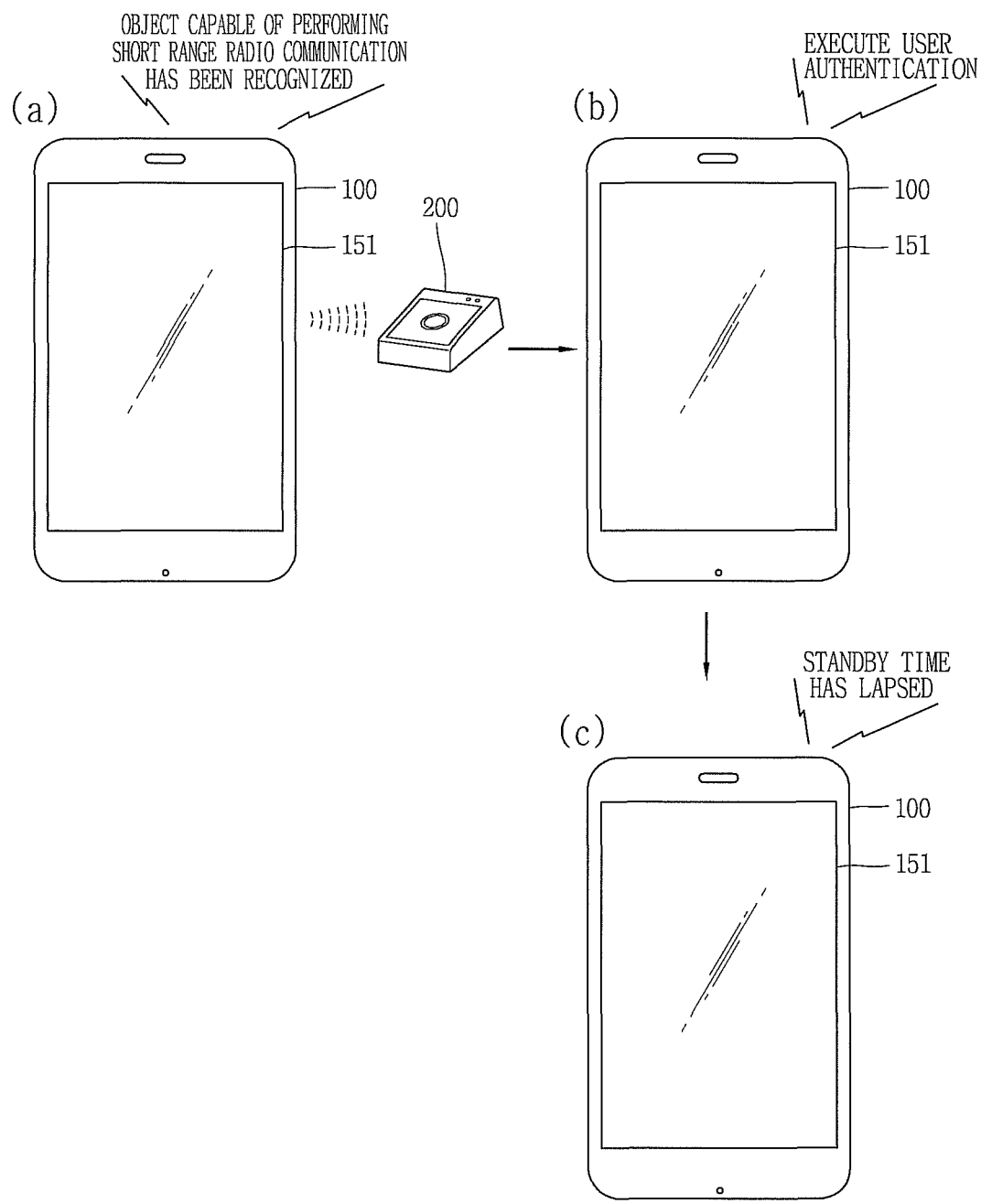

MOBILE TERMINAL AND CONTROL METHOD FOR THE SAME

CROSS-REFERENCE TO RELATED APPLICATION(S)

This application claims priority under 35 U.S.C. §119 to Korean Application No. 10-2011-0091449 filed in Korea on Sep. 8, 2011 and Korean Application No. 10-2012-0065154 filed in Korea on Jun. 18, 2012, whose entire disclosure are hereby incorporated by reference.

BACKGROUND

1. Field

The present disclosure relates to a mobile terminal, and particularly, to a mobile terminal capable of performing short-range radio communication, and a method for controlling the same.

2. Background

Mobile terminals capable of performing short-range radio communication and methods for controlling the same are known. However, they suffer from various disadvantages.

BRIEF DESCRIPTION OF THE DRAWINGS

The embodiments will be described in detail with reference to the following drawings in which like reference numerals refer to like elements wherein:

FIG. 1 is a block diagram of a mobile terminal according to an embodiment of the present disclosure;

FIGS. 4A, 4B and 4C are conceptual views that illustrate a method for controlling a mobile terminal according to an embodiment of the present disclosure;

FIGS. 11A, 11B and 11C are conceptual views that illustrate a method for controlling a mobile terminal according to one embodiment of the present disclosure;

FIG. 12 is a conceptual view that illustrates a method for storing a control command setting in a mobile terminal according to one embodiment of the present disclosure;

FIG. 13 is a conceptual view that illustrates a method for outputting a notification requesting for a control command input in a mobile terminal according to one embodiment of the present disclosure;

DETAILED DESCRIPTION

Figure 2A:
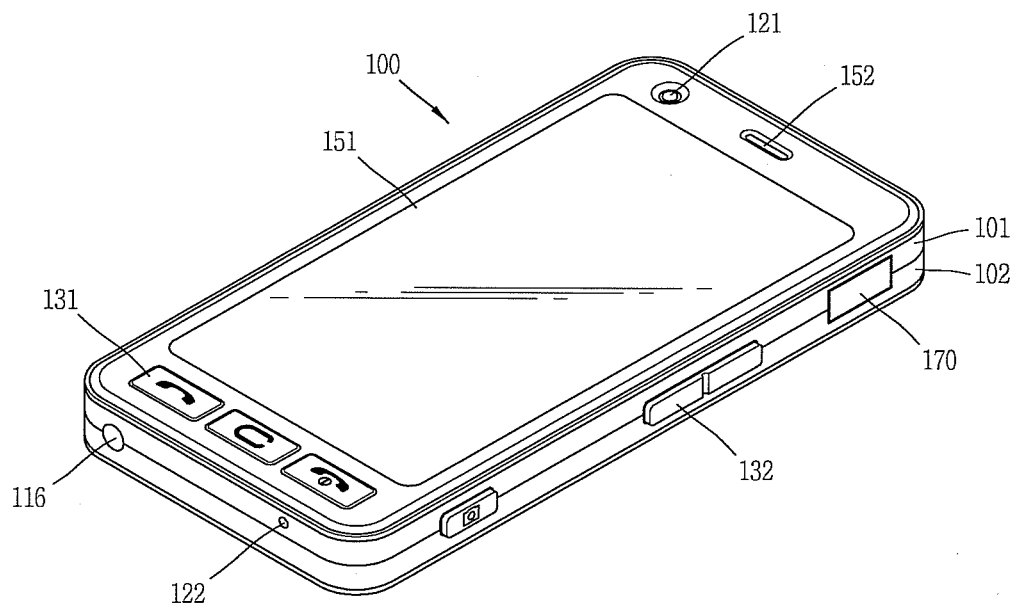
FIGS. 2A and 2B are perspective views of a mobile terminal according to an embodiment of the present disclosure.

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present disclosure will be explained in more detail with reference to the attached drawings. The suffixes attached to components of the wireless speaker, such as 'module' and 'unit or portion' were used for facilitation of the detailed description of the present disclosure. Therefore, the suffixes do not have different meanings from each other.

A terminal may be implemented in various types. For instance, the terminal as broadly described and embodied herein may be a mobile terminal such as a portable phone, a smart phone, a notebook computer, a digital broadcasting terminal, Personal Digital Assistants (PDA), Portable Multimedia Player (PMP), a navigation system, or a fixed terminal such as a digital TV, a desktop computer, etc. In the disclosure that follow, it is assumed that the terminal is a mobile terminal. However, it will be apparent to those skilled in the art that the present disclosure is not limited thereto and may be also applicable to a fixed terminal.

A mobile terminal may be configured to perform various functions including, for example, video and voice call communications, still or moving images capturing using a camera, voice storing, music file reproducing through a speaker system, image or video displaying, etc. Some mobile terminals may include additional functions such as for playing games or may be configured as multimedia players. Moreover, mobile terminals may also be configured to allow a user to view video or television programs by receiving broadcasting or multicast signals.

Various attempts have been made to implement enhanced functions of the mobile terminal not only by structural improvements, but also by hardware or software improvements. A mobile terminal may be configured to provide various services as communication technology develops and a user's desire increases. Among such services, a near field communication (NFC) service, used mainly for a short-range communication, may be provided to enable electronic payment and data communication. The NFC service is a type of RFID, and may use a specific frequency band (13.56 Mhz).

However, the NFC service has problems in that a connection between the mobile terminal and another terminal that provides NFC service may be established and data may be transferred without the user's consent. For example, a payment may be processed even when not requested or authorized by a user, or a user's private information may be compromised, when the mobile terminal comes within the range of an NFC device. In certain cases, the detection of the NFC device by the mobile terminal itself may trigger data transfer (e.g., payment information) to the NFC device without a separate request for the data.

Therefore, one aspect of the present disclosure is to provide a mobile terminal capable of enhancing security for data transmitted and received (transceived) through short-range radio communication.

FIG. 1 is a block diagram of a mobile terminal 100 according to an embodiment of the present disclosure. The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it should be appreciated that implementing all of the illustrated components is not a requirement. The mobile terminal 100 may be implemented to have greater or fewer number of components.

Hereinafter, each of the above components will be explained.

The wireless communication unit 110 may include one or more components allowing radio communication between the mobile terminal 100 and a wireless communication system or a network in which the mobile terminal is located. For example, the wireless communication unit may include one or more of a broadcast receiving module 111, a mobile communication module 112, a wireless Internet module 113, a short-range communication module 114, a location information module 115 or another appropriate type of communication module based on the desired type communication.

The broadcast receiving module 111 may receive broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a mobile terminal. The broadcast associated information may refer to information associated with a broadcast channel, a broadcast program or a broadcast service provider. The broadcast signal may include a TV broadcast signal, a radio broadcast signal, a data broadcast signal, or the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), or the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for many types of broadcast systems that provide a broadcast signal as well as the above-mentioned digital broadcast systems. Broadcast signals and/or broadcast-associated information received via the broadcast receiving module 111 may be stored in the memory 160.

The mobile communication module 112 may transmit and/or receive radio signals to and/or from at least one of a base station, an external terminal or a server. Such radio signals may include a voice call signal, a video call signal or various types of data according to text and/or multimedia message transmission and/or reception.

The mobile communication module 112 may be configured to implement a video call mode and a voice call mode. The video call mode indicates a call performed while a user views another party, whereas the voice call mode indicates a call performed while a user does not view another party. For implementation of the video call mode and the voice call mode, the mobile communication module 112 is configured to transfer at least one of voice data or image data.

The wireless Internet module 113 may support wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), or the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, or the like.

The location information module 115 is a module for acquiring a location (or position) of the mobile communication terminal. For example, the location information module 115 may include a GPS (Global Positioning System) module.

The A/V input unit 120 is configured to receive an audio or video signal. The A/V input unit 120 may include a camera 121 and a microphone 122. The camera 121 may process image data of still pictures or video acquired by an image capture device in a video capturing mode or an image capturing mode. The processed image frames may be displayed on a display 151.

The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, or the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to physical contact), a jog wheel, a jog switch, or the like. For example, a touch screen or touch pad may be provided that detects an amount of pressure or force applied thereto. The detected amount of pressure or force applied may be used as an input for a control command for authorizing data transfer, as described in further detail herein after.

The sensing unit 140 may include one or more sensors to detect a current status (or state) of the mobile terminal 100. For example, the sensing unit 140 may sense an opened or closed state of the mobile terminal 100, a location of the mobile terminal 100, the presence or absence of a user's touch (contact) with the mobile terminal 100 (e.g., touch inputs), the orientation of the mobile terminal 100, a motion of the mobile terminal 100 including an acceleration or deceleration as well as direction or velocity, etc., and may generate commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 is supplying power or whether or not the interface unit 170 is coupled with an external device.

The output unit 150 may be configured to provide an output in a visual, audible, and/or tactile manner (e.g., audio signal, video signal, alarm signal, vibration signal, etc.). The output unit 150 may include the display 151, an audio output module 152, an alarm unit 153, a haptic module 154, or the like.

The display 151 includes a display screen and may display information processed in the mobile terminal 100. For example, when the mobile terminal 100 is in a phone call mode, the display 151 may display a User Interface (UI) or a Graphic User Interface (GUI) associated with a call.

When the display 151 and the touch pad are overlaid in a layered manner to form a touch screen, the display 151 may function as both an input device and an output device. The display 151 may include at least one of a Liquid Crystal Display (LCD), a Thin Film Transistor-LCD (TFT-LCD), an Organic Light Emitting Diode (OLED) display, a flexible display, a three-dimensional (3D) display, or an e-ink display.

Some of these displays may be configured to be transparent so that objects may be seen therethrough, and may be referred to as a transparent display. A representative example of this transparent display may include a transparent organic light emitting diode (TOLED), etc. The mobile terminal 100 may include two or more displays 151. For example, the mobile terminal may include both an external display and an internal display. The touch screen may be configured to detect a touch input pressure or amount of force as well as a touch input location and a touch input area.

The display 151 may be implemented in two or more in number according to a configured aspect of the mobile terminal 100. For instance, a plurality of displays may be arranged on one surface integrally or separately, or may be arranged on different surfaces.

Here, if the display 151 and a touch sensitive sensor (referred to as a touch sensor) have a layered structure therebetween, the structure may be referred to as a touch screen. The display 151 may be used as an input device as well as an output device. The touch sensor may be implemented as a touch film, a touch sheet, a touch pad, or the like.

The touch sensor may be configured to convert changes of a pressure applied to a specific part of the display 151, or a capacitance detected at a specific part of the display 151, into electric input signals. Also, the touch sensor may be configured to sense not only a touched position and a touched area, but also a touch pressure.

When touch inputs are sensed by the touch sensors, corresponding signals are transmitted to a touch controller. The touch controller processes the received signals, and then transmits corresponding data to the controller 180. Accordingly, the controller 180 may sense which region of the display 151 has been touched.

A proximity sensor may be arranged at an inner region of the mobile terminal covered by the touch screen, or near the touch screen. The proximity sensor may be a sensor that senses presence or absence of an object approaching a surface to be sensed, or an object disposed near a surface to be sensed, by using an electromagnetic field or infrared rays without a mechanical contact. The proximity sensor may have a longer lifespan and enhanced utility and applications compared to a contact based sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized as a proximity sensor.

In the following description, for the sake of brevity, recognition of the pointer positioned to be close to the touch screen without being contacted will be called a 'proximity touch,' while recognition of physical contact of the pointer on the touch screen will be called a 'contact touch.' In the former case, when the pointer is in the state of the proximity touch, it may refer to the pointer being positioned to correspond vertically to a particular point on the touch screen.

The proximity sensor may detect a proximity touch and a proximity touch pattern (e.g., a proximity touch distance, a proximity touch speed, a proximity touch time, a proximity touch position, a proximity touch motion state, or the like), and information corresponding to the detected proximity touch operation and the proximity touch pattern can be output to the touch screen.

The audio output module 152 may output audio data received from the wireless communication unit 110 or stored in the memory 160 in a call signal reception mode, a call mode, a record mode, a voice recognition mode, a broadcast reception mode, or the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 may output a signal for informing about an occurrence of an event of the mobile terminal 100. Events generated in the mobile terminal may include call signal reception, message reception, key signal inputs, or the like. In addition to video or audio signals, the alarm unit 153 may output signals in a different manner, for example, to inform about an occurrence of an event. For example, the alarm unit 153 may output a signal in the form of vibration. The video signal or audio signal may be output through the display 151 or the voice output module 152. Therefore, the display 151 and the voice output module 152 may also be categorized as part of the alarm unit 153.

The haptic module 154 may generate various tactile effects the user may feel. A typical example of the tactile effects generated by the haptic module 154 is vibration. The strength and pattern of the haptic module 154 can be controlled. For example, different vibrations may be combined to be output or sequentially output.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, or an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are input or output. The memory 160 may store data relating to various patterns of vibrations and sounds output when touch input to the touch screen is sensed.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk or another appropriate type of a storage medium. Also, the mobile terminal 100 may be operated in relation to a web storage device that performs the storage function of the memory 160 over the Internet.

The interface unit 170 may serve as an interface to an external device connected with the mobile terminal 100. For example, the external devices may transmit data to an external device, receive and transmit power to each element of the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), or the like. In addition, the device having the identification module (also referred to as 'identifying device') may take the form of a smart card. Accordingly, the identifying device may be connected with the mobile terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 typically controls the general operations of the mobile terminal. For example, the controller 180 may perform controlling and processing associated with voice calls, data communications, video calls, or the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Once a preset condition of the mobile terminal is satisfied, the controller 180 can execute a locked state for limiting a user's input of control commands with respect to applications. And, the controller 180 can control a locked screen displayed in the locked state, based on a touch input sensed by the display 151 (also referred to as a 'touch screen') in the locked state.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or another appropriate type of electronic device designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Moreover, software code can be implemented by a software application written in any suitable programming language. The software codes may be stored in the memory 160 and executed by the controller 180.

Figure 2B:
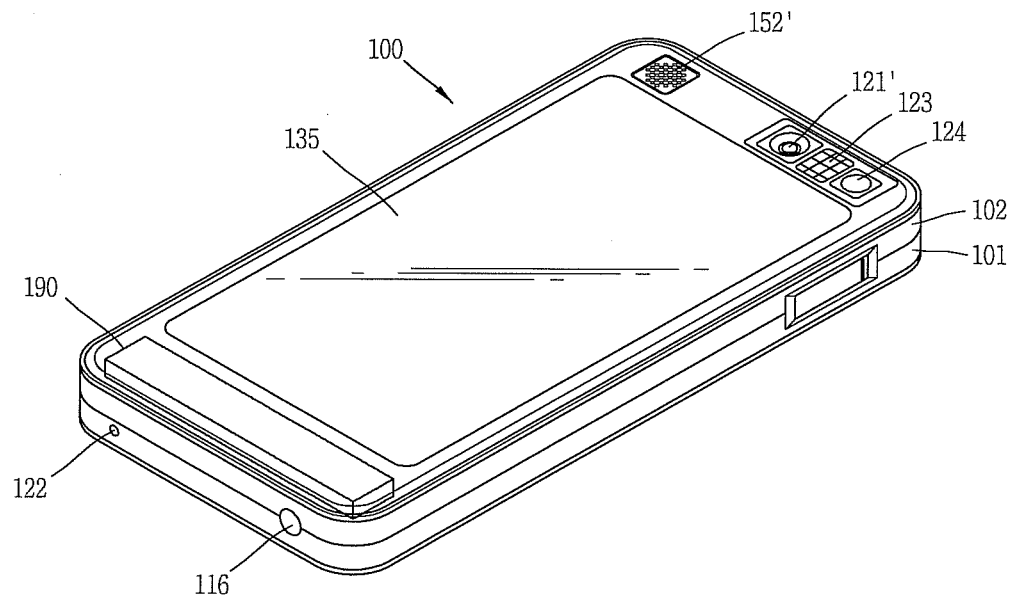

FIG. 2A is a front perspective view of the mobile terminal according to an embodiment of the present disclosure, and FIG. 2B is a rear perspective view of the mobile terminal according to an embodiment of the present disclosure The mobile terminal 100 may be a bar type mobile terminal. However, the present disclosure is not limited thereto, and may be a slide type in which two or more bodies are coupled to each other so as to perform a relative motion, a folder type, a swing type, a swivel type, or the like.

A body of the mobile terminal 100 may have a front surface, side surfaces and a rear surface. The body may have two ends in a lengthwise direction. A case (casing, housing, cover, etc.) that forms an outer appearance of the body may include a front case 101 and a rear case 102. A space formed by the front case 101 and the rear case 102 may accommodate various components therein. At least one intermediate case may further be disposed between the front case 101 and the rear case 102. Such cases may be formed by injection-molded synthetic resin, or may be formed using a metallic material such as stainless steel (STS) or titanium (Ti).

Various components may be disposed on the front case 101 such as a display 151, an audio output unit 152, a camera 121, user input units 130/131 and 132, a microphone 122, an interface unit 170, etc.

The display 151 may occupy a large portion of a main surface of the front case 101. The audio output unit 152 and the camera 121 may be arranged at a region adjacent to one end of the stereoscopic display 151, and the user input unit 131 and the microphone 122 may be arranged at a region adjacent to another end of the display 151. The user input unit 131, the interface unit 170, etc., may be arranged on the side surfaces of the front case 101 and the rear case 102. It should be appreciated that the positions of the various components may be changed based on the desired application, function, and/or aesthetics.

The user input unit 130 may be manipulated to receive a command for controlling the operation of the mobile terminal 100, and may include a plurality of manipulation units 131 and 132. The manipulation units 131 and 132 may be referred to as manipulating portions, and may include any type of ones that can be manipulated in a user's tactile manner. For example, the manipulation units 131 and 132 may be buttons, switches, touch sensors, pressure sensors, or the like.

Commands input through the first or second user input units 131 and 132 may be variously set. For instance, the first manipulation 131 may be configured to input commands such as START, END, SCROLL, or the like, and the second manipulation unit 132 may be configured to input commands for controlling a level of sound output from the audio output unit 152, or commands for converting the current mode of the display 151 to a touch recognition mode.

Referring to FIG. 2B, an audio output unit 152' (or speakers) may be additionally disposed at the rear case 102. The audio output unit 152' may implement a stereo function together with the audio output unit 152 (refer to FIG. 2A), and may be used for calling in a speaker phone mode.

A power supply unit 190 for supplying power to the mobile terminal 100 may be mounted to the body. The power supply unit 190 may be mounted inside the body or may be detachably mounted to the body.

A touch pad 135 for sensing touch may be additionally mounted to the rear case 102. Like the display 151, the touch pad 135 may be formed to be light-transmissive. In this case, if the display 151 is configured to output visual information from two surfaces thereof, the visual information can be recognized through the touch pad 135. The information output from the two surfaces can be controlled by the touch pad 135. Alternatively, a display may be additionally mounted to the touch pad 135, so that a touch screen can be disposed at the rear case 102. The touch pad 135 may be configured as a pressure sensor to detect an amount of pressure or force applied thereto.

A camera 121' may be additionally provided on the rear case 102. The camera 121' may face a direction which is opposite to a direction faced by the camera 121 (refer to FIG. 2A), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures. The cameras 121 and 121' may be installed at the body so as to rotate or pop-up.

A flash 123 and a mirror 124 may be additionally disposed close to the camera 121'. The flash 123 may operate in conjunction with the camera 121' when taking a picture using the camera 121'. The mirror 124 may be positioned relative to the camera 121' to allow a user to photograph himself in a self-portrait mode.

An audio output unit 252' may be additionally arranged on a rear surface of the body. The audio output unit 252' (refer to FIG. 2A) may cooperate with the audio output unit 252 (refer to FIG. 2A) so as to implement a stereo function. Also, the audio output unit may be configured to operate as a speakerphone.

The touch pad 135 may operate in association with the display 151 of the front case 101. The touch pad 135 may be disposed on the rear surface of the display 151 in parallel. The touch pad 135 may have a size equal to or smaller than that of the display 151.

The wireless communication unit 110 of the mobile terminal which can include at least one of the above components can perform data communication with an object capable of performing short-range radio communication, using the short-range communication module 114.

The short-range communication module 111, a type of RFID, may be configured to recognize an object through a short-range radio signal, for example, using a frequency band of 13.56 MHz. The object may be a remote device equipped with a short-range communication module. The short-range communication module 111 may perform short-range radio communication, short-range magnetic field communication or near magnetic field communication. In this case, the short-range communication module 111 may be a 'Near Field Communication' (NFC) device.

Through the short-range radio communication, bidirectional data communication can be performed for various types of applications such as for payment processing, information search, or file exchange. The mobile terminal may establish a connection for short-range radio communication data transfer with an object by physically approaching the object within a prescribed distance, for example, several centimeters (cm) to several tens of centimeters (cm).

The object may be an apparatus such as a mobile terminal or a payment terminal using short-range radio communication. Alternatively, the object may be a tag or a sticker or a card each having a micro chip for enabling short-range radio communication. That is, the object may be one of a variety of types of external devices, a memory, a sticker, a card, a tag, etc. capable of performing short-range radio communication with the mobile terminal of the present disclosure.

The wireless communication unit 110 may perform a function of a card emulator, a reader and/or a P2P through short-range radio communication with the object. For instance, when the recognized object is a card terminal, the mobile terminal of the present disclosure can operate with an RFID card. In this case, if the mobile terminal body 100 (refer to FIG. 2A) is disposed in close proximity to the card terminal, the card terminal can perform data communication for payment with the wireless communication unit mounted in the mobile terminal body.

After mobile terminals have recognized different objects, the mobile terminals may share data such as phone numbers, photos, etc., through a Peer to Peer (P2P) function. When a recognized object is a tag or a sticker or a card each having a micro chip therein, the wireless communication unit 110 may perform a function of a reader which reads information stored in the tag, the sticker or the card.

Moreover, once the mobile terminal detects the presence of a short-range radio object, the mobile terminal may transfer data associated with the object without a separate request for data. That is, a request for data from the object to the mobile terminal may not be necessary for data transfer, as the mobile terminal may automatically transfer data associated with the detected object based upon detection of the object. In this case, the detection of the presence of the object may be viewed as a request for data. It should be appreciated, however, that a request for data may be sent from the object to the mobile terminal after the two devices have established a connection with each other.

Before the mobile terminal performs data communication using a short-range radio signal with an object recognized by the wireless communication unit 110 and capable of performing short-range radio communication, the controller 180 may determine whether a control command is required to be input to authorize the data transfer. A notification may be generated to alert the user to the presence of the object and to prompt the user to input the control command if necessary. If the control command is required before transferring data, the controller 180 may determine whether the control command that has been input to the mobile terminal matches a command authorizing data communication. A determination unit 181 of the controller 180 may be configured to determine whether the control command input at the mobile terminal is a command authorizing data communication with the recognized object.

As aforementioned, if a control command authorizing data communication is not input in a state where the wireless communication unit 110 has recognized an object capable of performing short-range radio communication through a short-range radio signal, the controller 180 may restrict data communication between the object and the mobile terminal. This may prevent data communication from being performed when not requested or authorized by a user.

In the present disclosure, 'data communication,' 'data transfer' or 'data transception' may refer to substantial information exchange between the mobile terminal and an object. For example, data communication, data transfer or data transception may refer to more than establishing or initializing a connection between devices and may include a transfer of a requested payload data, for example, payment information, personal information, or the like. After the mobile terminal has recognized an object through a short-range radio signal, a function of a card emulator, a reader, a P2P, etc. may be performed between the mobile terminal and the object.

Figure 3:
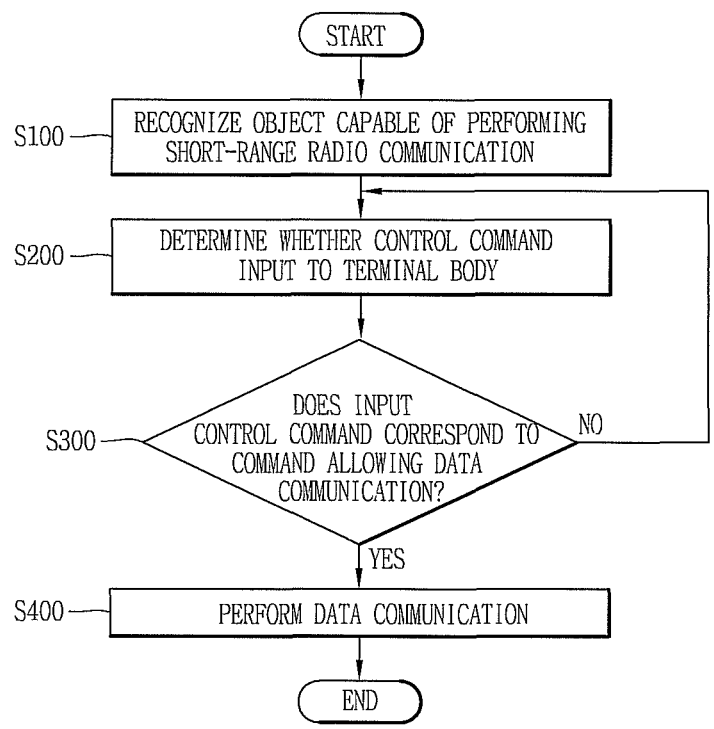
FIG. 3 is a flowchart of a method for controlling a mobile terminal according to an embodiment of the present disclosure.
Figure 4B:
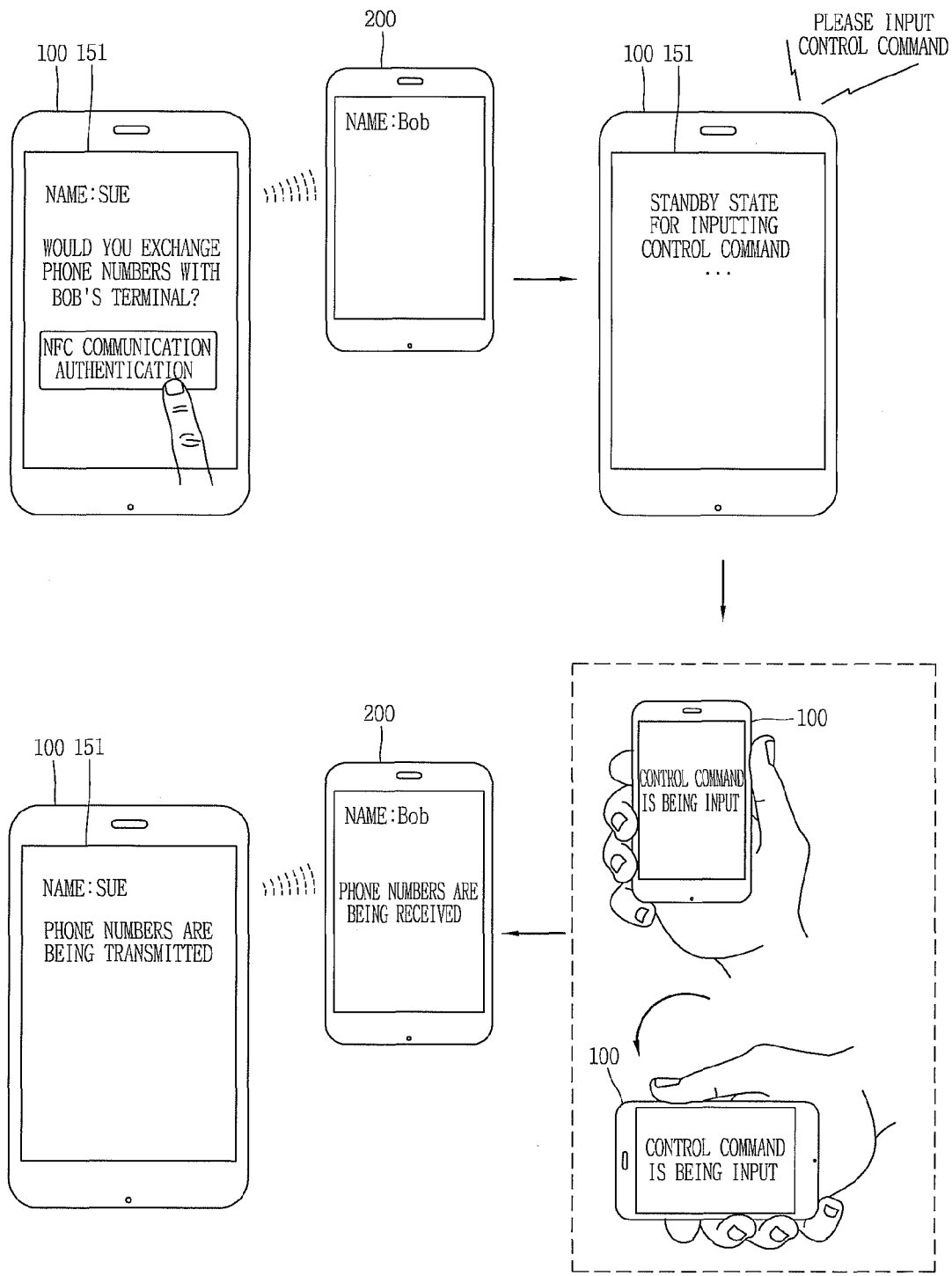
Figure 4C:
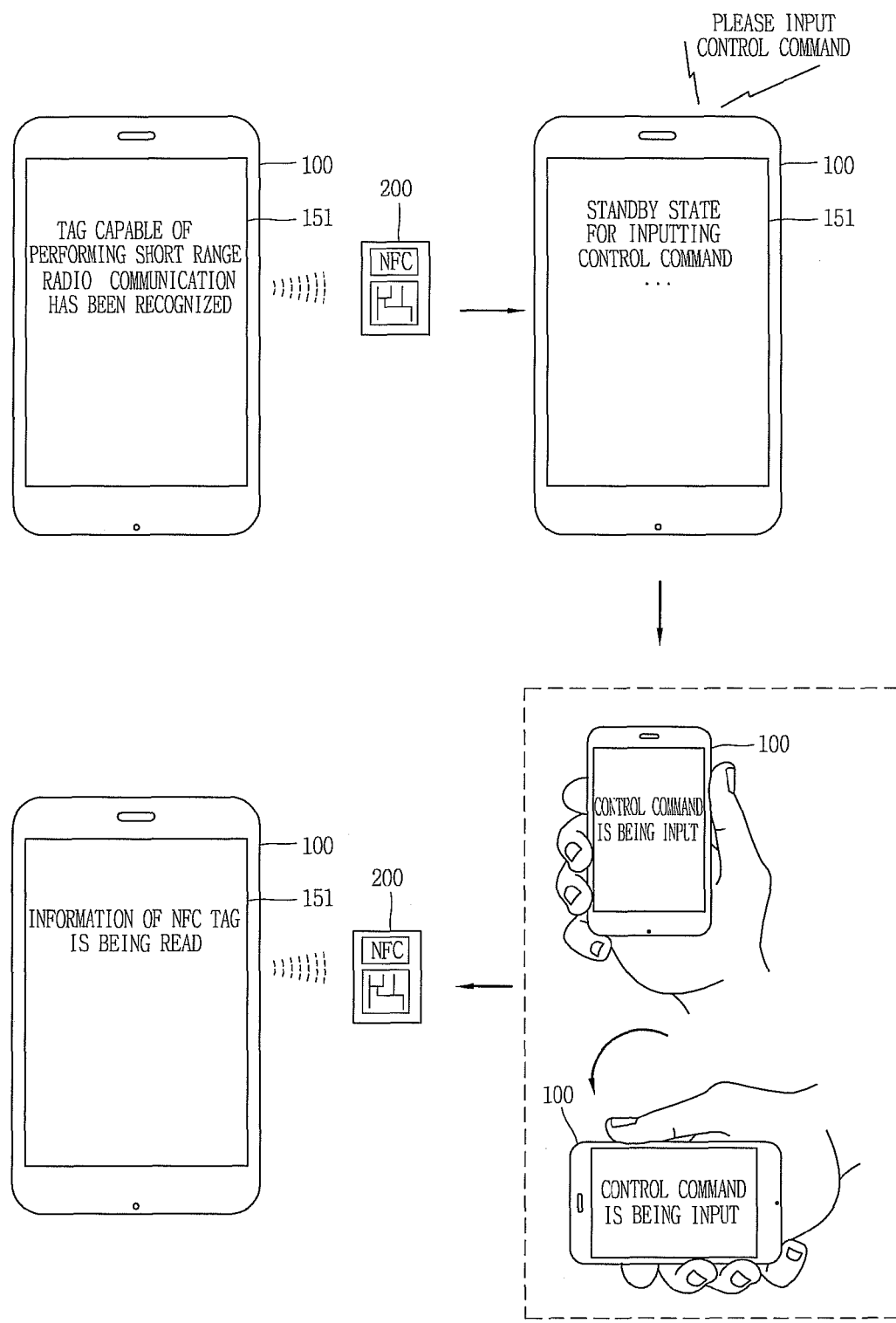

Hereinafter, a method for determining a control command and authorizing data communication based on the control command according to the present disclosure will be explained with reference to FIGS. 3, 4A, 4B and 4C. FIG. 3 is a flowchart that illustrates a method for controlling a mobile terminal according to an embodiment of the present disclosure, and FIGS. 4A, 4B and 4C are conceptual views that illustrate a method for controlling a mobile terminal according to an embodiment of the present disclosure.

Firstly, an object (remote device) capable of performing short-range radio communication may be recognized by the mobile terminal 100, in step S100. Here, the object capable of performing short-range radio communication may be recognized through the short-range communication module 114 of the wireless communication unit 110.

As shown in FIG. 4A, when the mobile terminal body 100 is brought within a prescribed range of an object 200 capable of performing short-range radio communication (e.g., a payment terminal) so as to perform short-range radio communication, the wireless communication unit 110 may recognize the object 200. On the contrary, the object 200 may initiate communication to recognize the mobile terminal using a short-range radio signal when the mobile terminal is within a prescribed range.

Once the object 200 is recognized by the wireless communication unit 110, the determination unit 181 (or the controller 180) may determine whether a control command is input to the mobile terminal body 100, in step S200. The control command may be a command for controlling data communication between the wireless communication unit 110 and the object 200. The controller 180 may control data communication to be performed only when determination unit 181 has determined the input control command is a command authorizing data transfer to the object 200.

In one embodiment, once the object 200 is recognized, a notification may be generated to prompt the user to input the control command. The notification may alert the user to the presence of the object 200 within the prescribed range. The notification may be a prompt or message displayed on the display, as illustrated in (a) of FIG. 4A, or it may be a non-visual alert, such as a vibration, sound, or the like. The notification will be described in further detail with reference to FIG. 7 hereinafter.

The control command may be configured in various manners. For instance, the control command may be input through motion or orientation of the mobile terminal body 100. That is, the control command may be an input signal generated in response to a sensed change in motion or position of the mobile terminal body 100. This may allow a user to input a control command in a simple manner, without manipulating additional keys or inputs at the display 151. Moreover, the control command may be input without displaying any prompt or information on the display, or while the display is turned off or is inactive, as described in further detail hereinafter.

A sensing unit 140 (e.g., sensor) may sense a motion or position of the mobile terminal body 100. The sensing unit 140 may be set to be activated only when the object 200 has been recognized. Upon recognition of the object 200, the sensing unit 140 may detect a position/orientation (e.g., a degree of incline) of the mobile terminal body 100 or may obtain a motion pattern of the mobile terminal body 100, as illustrated in (c) of FIG. 4A. For example, the sensing unit 140 may detect an orientation of the mobile terminal body 100 (e.g., inclined at 90°). The sensing unit 140 may also detect an amount of rotation, for example, a rotation of the mobile terminal body 100 greater than or equal to a prescribed amount (e.g., rotated by at least 90°). The motion pattern may also be a combination of a final orientation of the mobile terminal body 100 and a prescribed amount of rotation preceding the final orientation (e.g., inclined at 90° after being rotated by at least 45°). This may prevent erroneous command inputs being recognized. The motion pattern may also be a shaking motion or another appropriate type of motion of the mobile terminal.

Then, the determination unit 181 may compare the motion pattern of the mobile terminal body 100 with a preset pattern for authorizing data transception. If the detected motion pattern corresponds to the preset pattern, the mobile terminal 100 may generate a control command authorizing data transception. The preset pattern may be a pattern pre-stored in the controller 180, or may be a pattern set by a user's selection.

Once the object 200 is recognized by the wireless communication unit 110, the determination unit 181 may wait for an input of a control command, as illustrated in (c) of FIG. 4A. A notification may be generated to alert the user to input the control command. The notification may be a prompt displayed on the display, a sound, a vibration, or another appropriate type of indication to the user. In this case, a user may input a prescribed control command, for example, by moving the mobile terminal body 100 according to a prescribed pattern or position or by applying a prescribed amount of pressure to the body of the mobile terminal.

For instance, in a state where the preset pattern corresponds to an inclined angle (90°) of the mobile terminal body 100, if the mobile terminal body 100 is inclined by 90°, for example, the determination unit 181 may determine that a control command has been input.

Once a control command input to the mobile terminal body 100 is detected by the determination unit 181, in step S200, the controller 180 may determine whether the detected control command corresponds to a previously stored command for authorizing data transfer, in step S300. For instance, if the control command detected by the determination unit 181 is determined to be a command authorizing data communication between the wireless communication unit 110 and the object 200, the controller 180 may control data communication to be enabled between the wireless communication unit 110 and the object 200, in step S400.

Alternatively, if the control command detected by the determination unit 181 is not a command authorizing data communication between the wireless communication unit 110 and the object 200, e.g., if a motion pattern of the mobile terminal body 100 does not correspond to a preset pattern, the controller 180 may generate a notification requesting another command input and again determine whether a control command has been input to the terminal body, in step S200. In one embodiment, the controller 180 may disable or prevent data communication between the wireless communication unit 110 and the object 200, in step S400, without requesting input of another command input, in step S200.

If a preset control command has not been input after an object is recognized by the wireless communication unit 110, data communication may be blocked. The controller 180 may be configured to authorize data transfer only when the preset control command has been input. For example, in a state where a preset pattern is a prescribed inclined angle (90°) of the mobile terminal body 100, data communication may be allowable only when the mobile terminal body is inclined at the prescribed angle. Therefore, the wireless communication unit 110 can complete data communication with the object 200 without having any problems.

When the recognized object 200 is a card terminal (e.g., when the mobile terminal 100 of the present disclosure performs a card emulation function), the mobile terminal 100 can safely perform payment with the payment terminal 200 through data transception, by approaching to the payment terminal 200 (object) and transferring the payment information after receipt of an input control command to authorize the payment.

Referring to FIG. 4B, the mobile terminal 100 may perform data communication with another terminal 200 using a P2P function. In this case, the controller 181 may control the two terminals to share information only when a preset control command (e.g., motion of the mobile terminal 100) is input.

FIG. 4C illustrates the mobile terminal of the present disclosure performing a reader function. The wireless communication unit 110 of the mobile terminal 100 may read information stored in the object 200 having a microchip therein, e.g., a tag, a sticker, a card, or the like. In this case, the controller 180 may control the wireless communication unit 110 to read information stored in the object 200 when a preset control command has been input to the mobile terminal body.

Unless a control command satisfying a preset condition is input, even if an object capable of performing short-range radio communication has been recognized by the wireless communication unit 110, the controller 180 may not allow data communication with the object 200. This may enhance security of transferred data.

While it may be possible to require a control command prior to authorizing every transaction, the control commands may be required only in particular situations. This will be explained in more detail with reference to FIG. 5.

Figure 5:
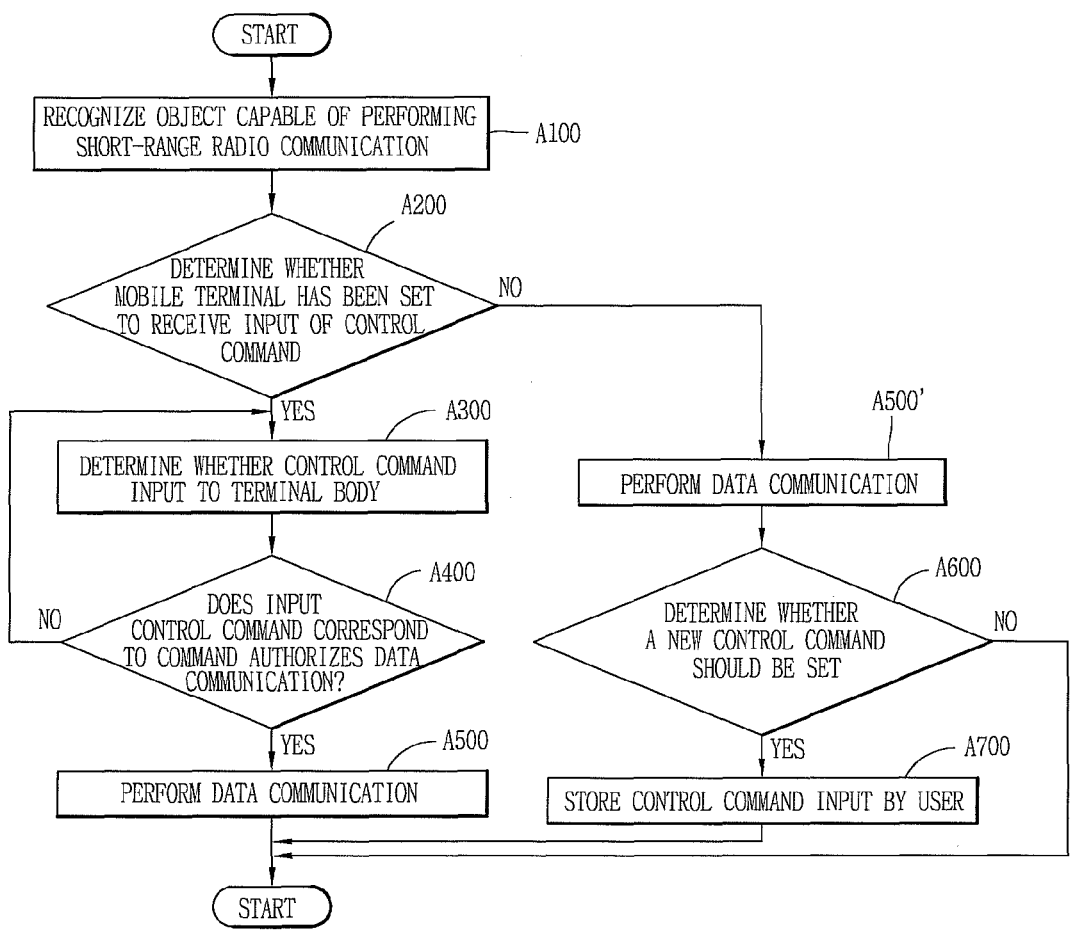
FIG. 5 is a flowchart of a method for controlling a mobile terminal according to another embodiment of the present disclosure.

FIG. 5 is a flowchart of a method for controlling a mobile terminal according to another embodiment of the present disclosure. The wireless communication unit 110 may detect an object 200 capable of performing short-range radio communication, in step A100. Then, the controller 180 may determine whether the mobile terminal has been set to receive an input of a control command, in step A200. If it is determined that the mobile terminal has not been set to receive input of a control command, the controller 180 may allow the recognized object 200 to immediately perform data communication with the wireless communication unit 110, in step A500'. On the contrary, if it is determined that the mobile terminal is set to receive input of a control command, the determination unit 181 may wait for input of a control command (e.g., a user input), in step A300.

In one embodiment, once it has been determined that a control command is required to authorize the data transfer, in step A200, a notification may be provided to alert the user to the presence of the object 200 within the prescribed range and an associated request for data transfer. The notification may be a prompt or message displayed on the display or it may be a non-visual alert, such as a vibration, sound, or the like. The notification will be described in further detail with reference to FIG. 7 hereinafter.

Upon detecting the input of the control command, the determination unit 181 may determine whether the control command is a command authorizing data transfer, in step A400.

A setting for whether to require the control command for authorizing data transfer to the object 200 may be set in a settings menu ("SET" menu) of the mobile terminal. The settings menu may include a selection for activating the control command feature, e.g., a selectable button labeled "Input a Control Command to the Mobile Terminal Body." The determination unit 181 may be configured to determine whether an input control command corresponds to a command allowing data communication only when the setting in the settings menu has been set.

In the case that the mobile terminal is set to receive input of a control command, data communication can be performed between the object 200 and the wireless communication unit 110 only when a control command input to the mobile terminal body 100 is a command authorizing data communication. Whether the control command is to be input or not may be changed by a user's setting. Moreover, the settings in the setting menu may also require a control command for all types of data communication with an object 200, requiring a control command to always be input, or for specific types of data communication.

In one embodiment, the setting menu may include selections for requiring a control command based on a preset condition. For instance, a user may set the control command to be determined according to a type of specific data, a type of a communication channel, a type of an application, whether payment-related communication or information has been encrypted or not, whether personal information included in a Universal Subscriber Identity Module (USIM) card has been used or not, or another appropriate type of communication or data type.

The above setting may be used for protection of critical data, to prevent unauthorized information leakage to the outside (to the object 200) in a case that a control command has not been input from a user. A setting for whether a control command is required for authorizing data transfer with respect to data satisfying a preset condition may be controlled by the controller 180 or by a user. The determination unit 181 may analyze data to be transferred to determine whether a control command should be required prior to transferring the data. Then, if the analyzed data satisfies the preset condition, the determination unit 181 may require a control command to be input prior to authorizing transfer of the data.

For instance, the determination unit 181 may require a control command to be input to the mobile terminal body 100 only when data to be transferred between the object 200 and the wireless communication unit 110 relates to personal or private information. Here, the privacy-related information may be payment information, address information, message information, mail information, photos, moving images, memos, a diary, etc.

If data transceived between the object 200 and the wireless communication unit 110 is privacy-related information, the determination unit 181 may determine whether a control command has been input to the mobile terminal body 100. The determination unit 181 may determine whether a control command has been input to the mobile terminal body when the requested data satisfies the preset condition, or when it is set to always require a control command regardless of a type (content) of the communication data.

Referring again to FIG. 5, if a user or the controller 180 has set the setting for requiring an input of a control command, the determination unit 180 may determine whether a control command has been input to the mobile terminal body, in step A300. Then, the controller 180 may control data communication between the recognized object 200 and the wireless communication unit 110 to be performed, in step A500, only when the control command is determined to be a command authorizing data communication, in step A400. If the control command is determined not to be a command authorizing data communication (e.g., incorrect or unrecognized control command, or no control command recognized), then the controller may continue to wait for a control command for a predetermined time period or may display prompts to assist the user, for example, to guide the user in authenticating the transfer or providing a list of applications for processing the transaction as discussed in further detail with reference to FIG. 8 hereinafter.

The step of detecting a control command input to the mobile terminal body, in step A300, and the step of authorizing data communication, in step A400, correspond to the control method aforementioned with respect to FIG. 4, and thus, repetitive explanations thereof will be omitted.

If it is determined, in step A200, that a user or the controller 180 has set the wireless communication unit 110 and the object 200 to perform data communication in a state where no control command is input, the controller 180 may control data communication between the object 200 and the wireless communication unit 110 to be performed, in step A500'. Then, upon completion of the data communication, the controller 180 may control a control command to be set by activation of the determination unit 181, in steps A600 and A700.

The above configuration is implemented so as to prevent critical data (important data) from being transferred at random in a non-secure manner, through short-range radio communication. The controller 180 may output inducement information for inducing activation of the determination unit 181 after completion of the data communication between the object 200 and the wireless communication unit 110. For example, after completion of the data communication in step A500', the user may be prompted to set control command settings such that a control command may be required at the mobile terminal for subsequent short-range radio communications.

Figure 6:
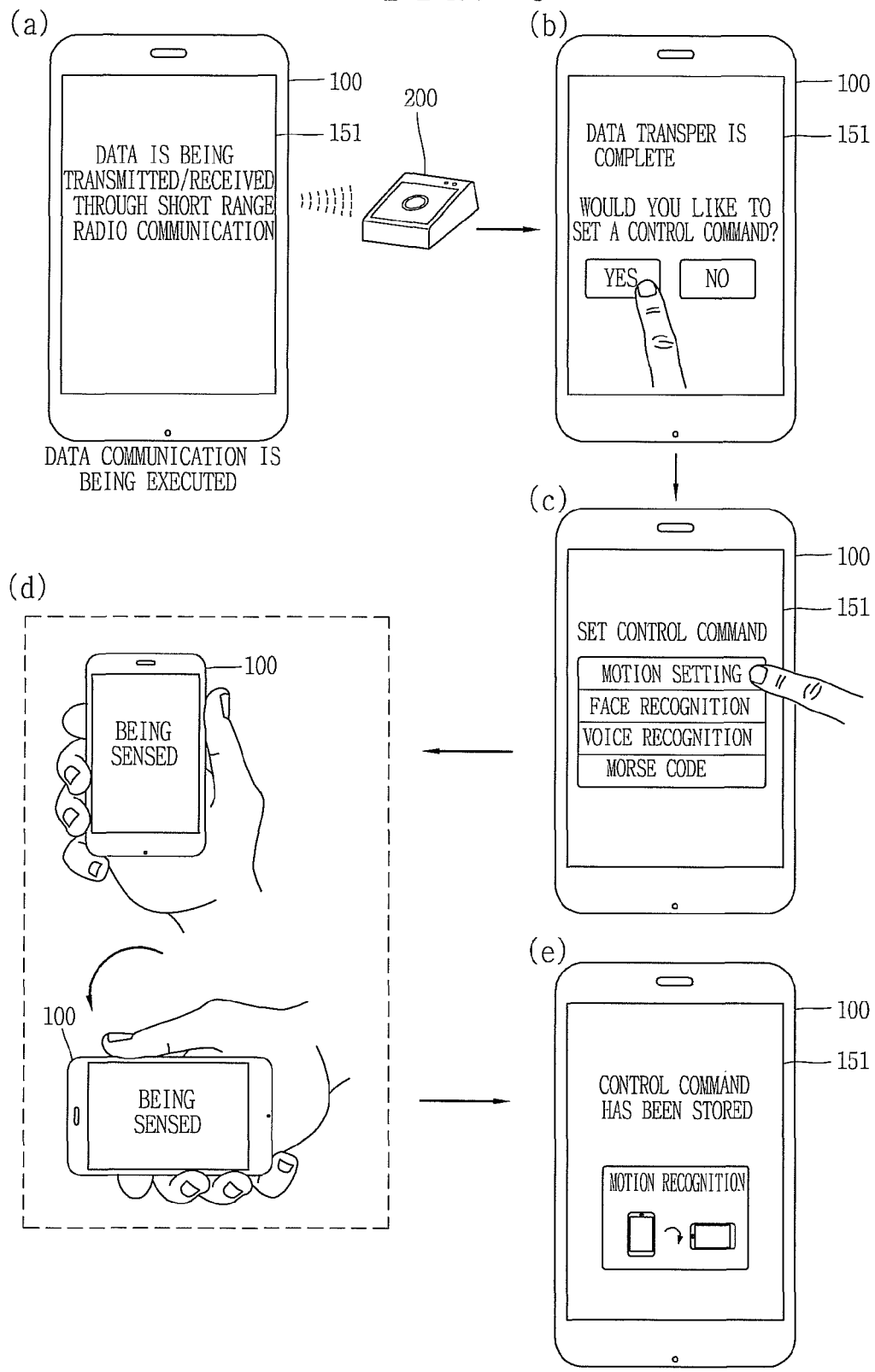
FIG. 6 is a conceptual view that illustrates a method for storing a control command setting in a mobile terminal according to an embodiment of the present disclosure.

As illustrated in (b) of FIG. 6, upon completion of the data transmission, the controller 180 may output to the display 151 an inducement information inquiring "Would you like to set a control command?". Once a button for "Set a control command" is selected by a user, the controller 180 may output various types of imputable control commands for selection, as illustrated in (c) of FIG. 6. If one of the displayed control commands is selected by the user, e.g., 'motion setting' is selected, the user may manipulate the mobile terminal corresponding to a desired motion to be set as a control command. The user may be guided during the input of the motion pattern, for example, to rotate the mobile terminal or to shake the mobile terminal, etc, as illustrated in (d) of FIG. 6.

More specifically, if the mobile terminal body 100 is moved by a user to form a pattern, the sensing unit 140 may sense the motion and the controller 180 may store the pattern detected by the sensing unit 140 as a control command, in step A700 of FIG. 5. The motion pattern may be one of preexisting patterns or a custom pattern as entered by the user. If a motion pattern of the mobile terminal body 100 is stored to correspond to a control command, data communication may be performed during a subsequent short-range radio communication only when the control command has been input.

In step A700, not only may a pattern corresponding to a control command be stored, but a setting for requiring a control command based on various criteria, e.g., according to a data type, an application type or a type of a recognized object, etc., may be stored.

Moreover, the mobile terminal may be set so that only a control command satisfying a preset condition can be input. This can prevent input of an undesired control command. Moreover, the mobile terminal may be set so that a control command can be immediately input upon completion of data communication (e.g., user is prompted to create a new control command immediately after completion of data transfer). This can reduce a user's inconvenience in accessing the settings menu ('SET' menu).

Hereinafter, with reference to FIG. 7, a method for outputting inducement information to induce input of a control command when no control command has been input for a preset time, in a state where the mobile terminal is set to receive input of a control command will be described.

Figure 7:
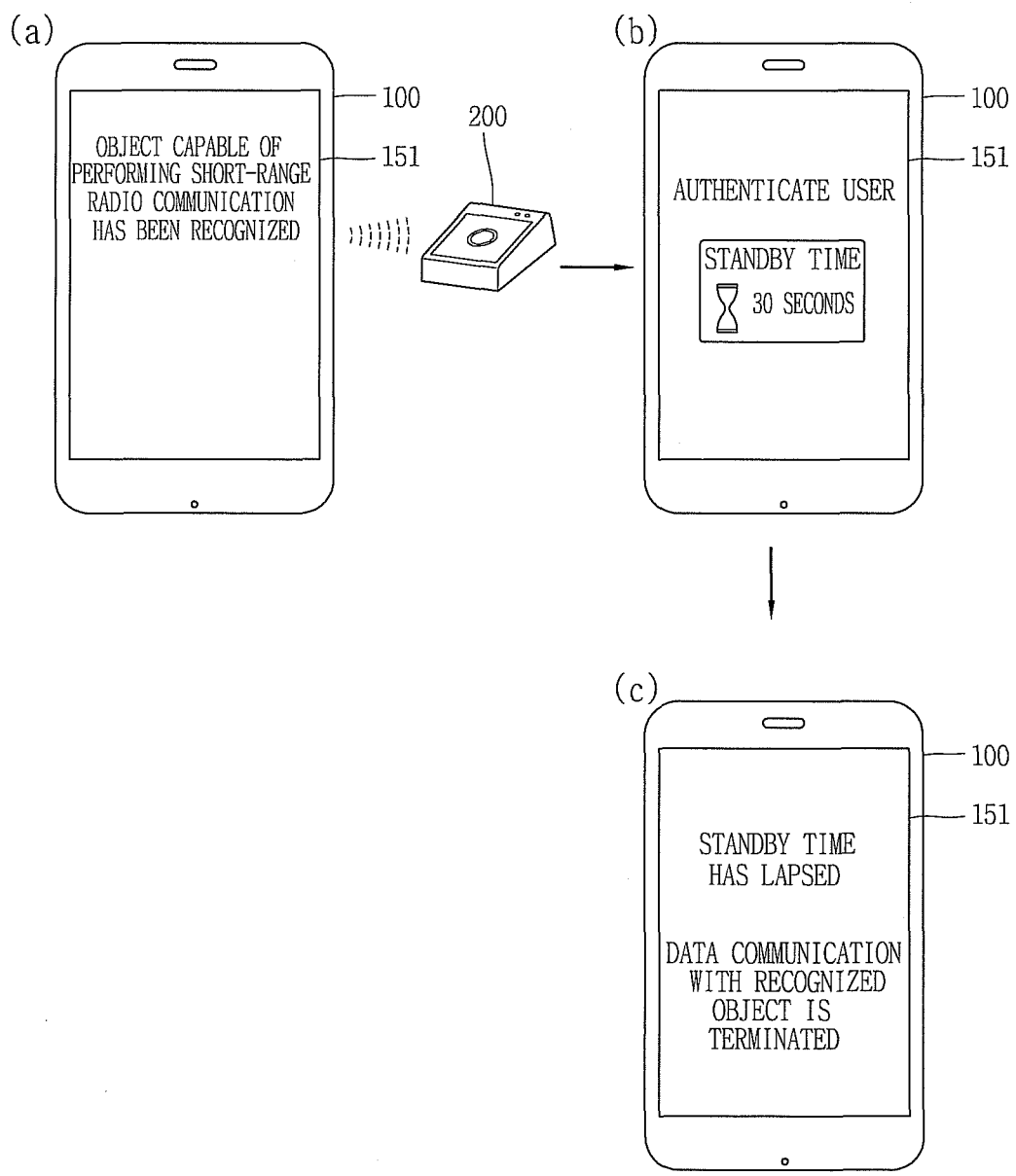
FIG. 7 is a conceptual view that illustrates a method for generating a notification request for a control command input in a mobile terminal according to an embodiment of the present disclosure.

FIG. 7 is a conceptual view that illustrates a method for inducing input of a control command in a mobile terminal according to an embodiment of the present disclosure. Once the object 200 capable of performing radio communication is recognized by the wireless communication unit 110, as illustrated in (a) of FIG. 7, the determination unit 181 may wait a prescribed amount of time for input of a control command, as illustrated in (b) of FIG. 7.

If a control command has not been input for a preset time by a user, the controller 180 may output a notification or inducement information for inducing input of a control command. The controller 180 may also generate the inducement information or notification immediately after detecting a presence of the object 200.

The inducement information can be output to the display 151 in the form of a text or an image, or can be output through a speaker in the form of sound, or can be output in the form of vibration. For example, in one embodiment, the inducement or notification may be generated without displaying information on the display, or while the display is turned off or is inactive.

The notification may be a type that does not require the user to visually inspect or review a message on the display of the mobile terminal. The notification may be a vibration of the mobile terminal, an audible alert, an indicator light, or another appropriate type of indication to the user. Moreover, the notification may be generated while the display is turned off or is inactive. In this way, the user may be quickly and conveniently be alerted to the presence of a short-range radio object 200 and/or an associated request for data transfer, and may input the control command quickly without the need to view a message on the display.

The notification may be uniquely associated with a particular short-range radio object, a type of object, or a type of data being requested. For example, when the notification is a vibration, the vibration may have a prestored pattern or intensity set to correspond to a request for a particular type of data transfer over short-range radio signals, e.g., a payment request. Moreover, the notification may be turned on or off in the user settings of the mobile terminal.

The standby time for input of a control command may be set by a user's selection. If no control command is input for the preset standby time, the controller 180 may prevent data communication between the mobile terminal and the object 200, as illustrated in (c) of FIG. 7. More specifically, even if the wireless communication unit 110 receives a short-range radio signal from an object 200 (e.g., as a magnetic flux around the mobile terminal body 100 changes due to the object 200), the controller 180 may terminate a preparation process for data communication without processing the short-range radio signal received from the object 200.

Figure 8:
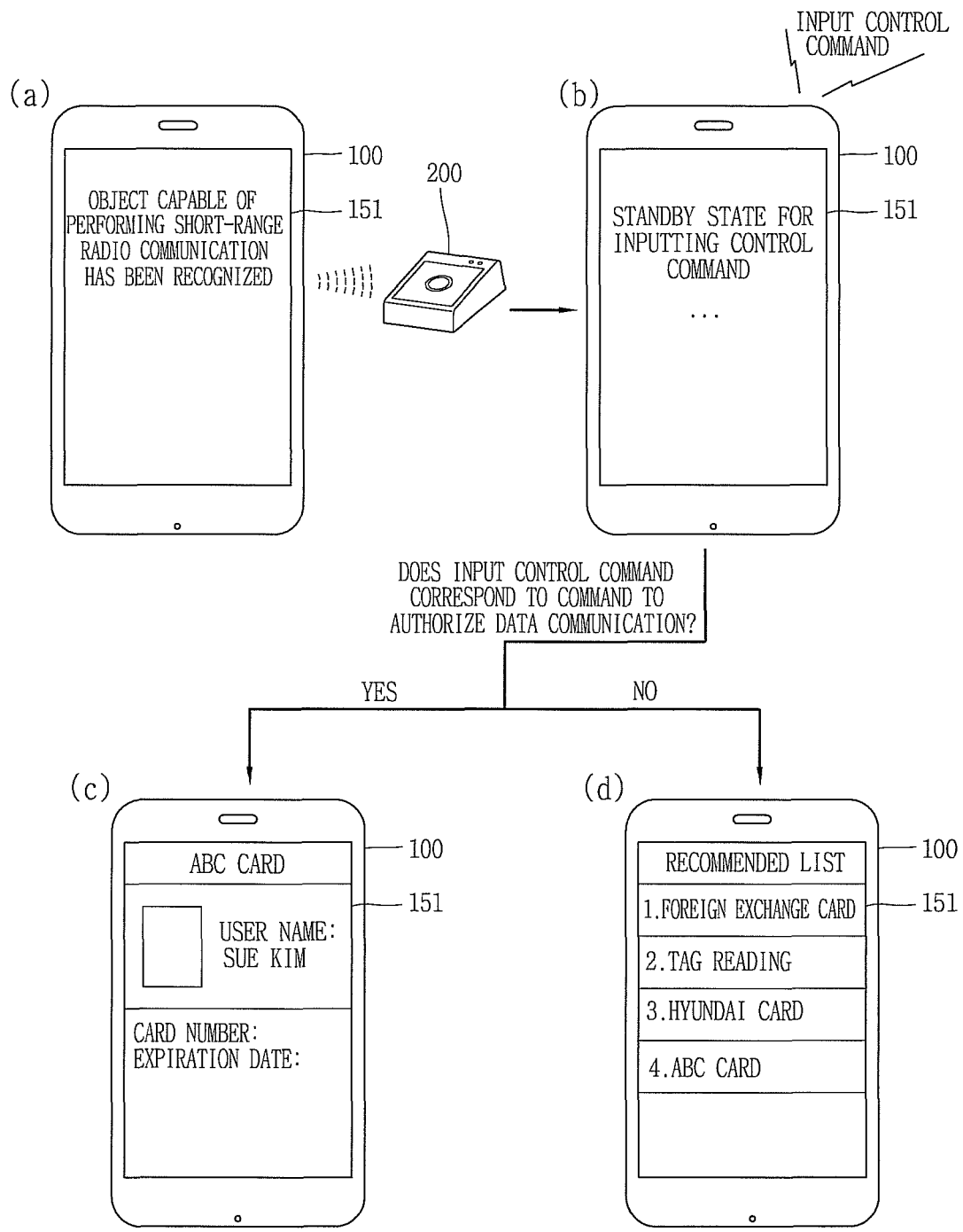
FIG. 8 is a conceptual view that illustrates a method for controlling a mobile terminal based on a received control command according to an embodiment of the present disclosure.

FIG. 8 is a conceptual view that illustrates a method for controlling a mobile terminal based on a received control command according to an embodiment of the present disclosure.

As previously described, after an object has been recognized by the wireless communication unit 110 and a control command has been input by a user, it may be determined, by the determination unit 181, whether an input control command is a command authorizing data communication. The subsequent step is differently performed according to a determination result.

For instance, if a control command input by a user corresponds to a command authorizing data communication with the object 200, the controller 180 may control data communication between the recognized object 200 and the wireless communication unit 110 to be performed, as illustrated in (c) of FIG. 8.

In this case, the controller 180 may analyze authentication information received from the recognized object 200, or may analyze information preset in each object, thereby activating an application required to perform data communication with the object 200 based on the analyzed information.

As shown in FIG. 8, if a control command input by a user is a command authorizing data communication with the object 200, the controller 180 may activate an application to be used in the data communication based on preset authentication information or authentication information transmitted from the object.

The phrase "Activating an application" as applied herein may refer to executing a specific application and transceiving data using the executed application. Alternatively, "Activating an application" may refer to controlling data communication using an application being executed. For instance, if the object 200 corresponding to a card payment terminal is recognized by the wireless communication unit 110, the controller 180 may execute 'ABC card' application based on a user's setting or authentication information, and may control data communication between the wireless communication unit 110 and the object 200.

If a control command input by a user is not a command authorizing data communication with the object 200, the controller 180 may analyze a type of the recognized object 200, and may detect an application corresponding to the type and capable of using short-range radio communication. The controller 180 may display a list of detected applications on the display 151, thereby providing information on usable applications to a user even when a control command has not been correctly input, as illustrated in (d) of FIG. 8.

FIGS. 9A to 9E are conceptual views that illustrate a method of inputting a control command at a control command the mobile terminal according to an embodiment of the present disclosure.

As previously described, a control command may be input through motion of the mobile terminal body. However, in the mobile terminal of the present disclosure, a control command can be easily input in various manners, rather than through motion of the mobile terminal body. A type of the control command may be selected and stored in various manners through the setting menu ('SET' menu).

Figure 9A:
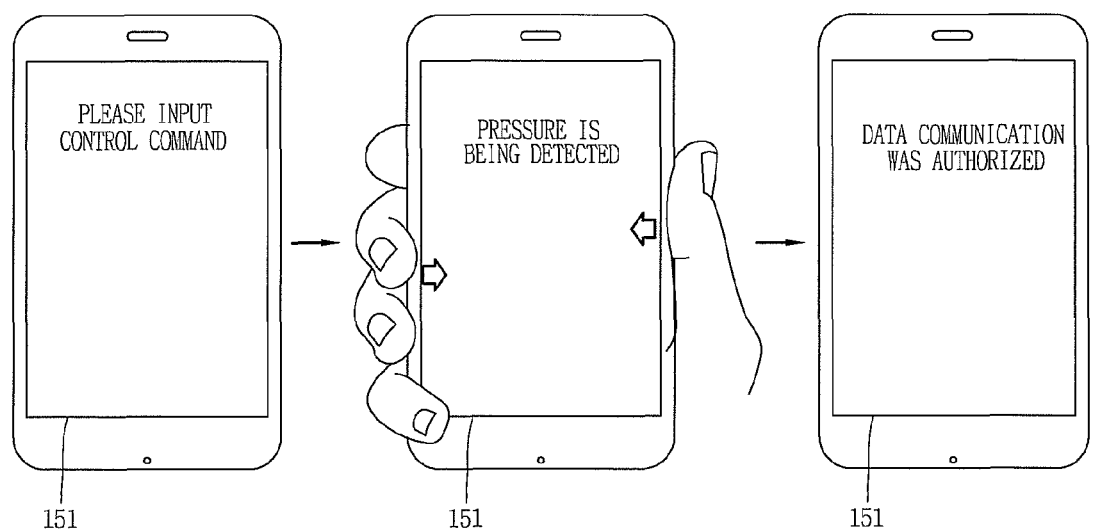
FIGS. 9A to 9E are conceptual views that illustrate a method for inputting a control command at a mobile terminal according to an embodiment of the present disclosure.

Referring to FIG. 9A, as pressure applied to the mobile terminal is sensed by the sensing unit 140, the controller 180 may set the sensed pressure as a control command. More specifically, a pressure sensor of the sensing unit 140 can sense the degree of pressure or force applied to the mobile terminal, and can sense the degree of a user's grasping power (grip) applied to the mobile terminal. Accordingly, the degree of a user's grasping power, a frequency (number of times), a pattern, etc. may also be utilized as a control command.

Once an object capable of performing short-range communication is recognized by the wireless communication unit 110, the controller 180 may output a notification or prompt for input such as an inducement information on the display for inducing input of a control command. In one embodiment, the notification or prompt may be generated without using the display, or while the display is turned off or is inactive such that the control command to authorize data transfer may be input without the need to view the display. Moreover, if a user applies pressure corresponding to a preset value to the mobile terminal, the controller may recognize the pressure as a control command.

The determination unit 181 may determine whether the pressure applied to the mobile terminal corresponds to a preset control command, and determines whether to allow data communication or not.

It should be appreciated that the sensor for detecting pressure may be a pressure sensor, a button, or another appropriate type of device, and may be positioned on various regions of the mobile terminals, such as the side, front or rear surfaces or it may be incorporated into the display 151. For example, the display may be configured to sense an amount of pressure or force, and the pressure input may be input at the display.

Figure 9B:
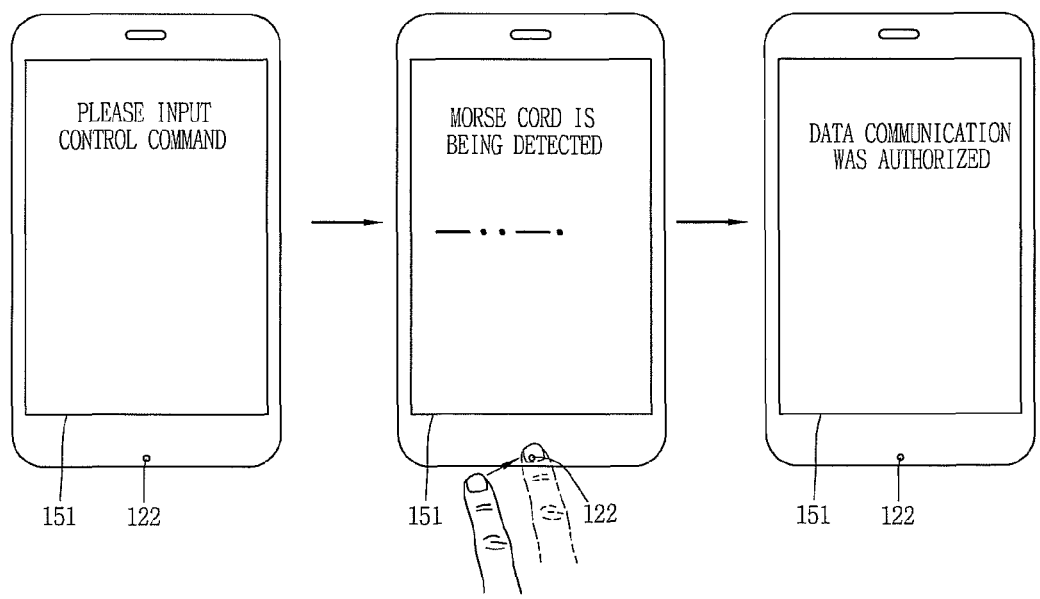

Referring to FIG. 9B, a control command may be set and input by using Morse code. More specifically, a control command may be input by consecutively inputting a specific beat or pattern to the microphone 122 or a sensor. Once an object capable of performing short-range communication is recognized by the wireless communication unit 110, the controller 180 may output a notification or prompt for input such as an inducement information on the display for inducing input of a control command. In one embodiment, the notification or prompt may be generated without using the display, or while the display is turned off or is inactive such that the control command to authorize data transfer may be input without the need to view the display, as described in further detail hereinafter.

Then, if tapping having a preset specific beat or pattern is input to the microphone 122, the controller 180 may recognize the input as a control command. The input may be entered using a button, a sensor such as an illumination sensor, the TovCa screen display, or another appropriate type of input device. The determination unit 181 may determine whether the tapping input with a specific beat or pattern corresponds to a preset control command, and may determine whether to allow data communication based on the input.

Figure 9C:
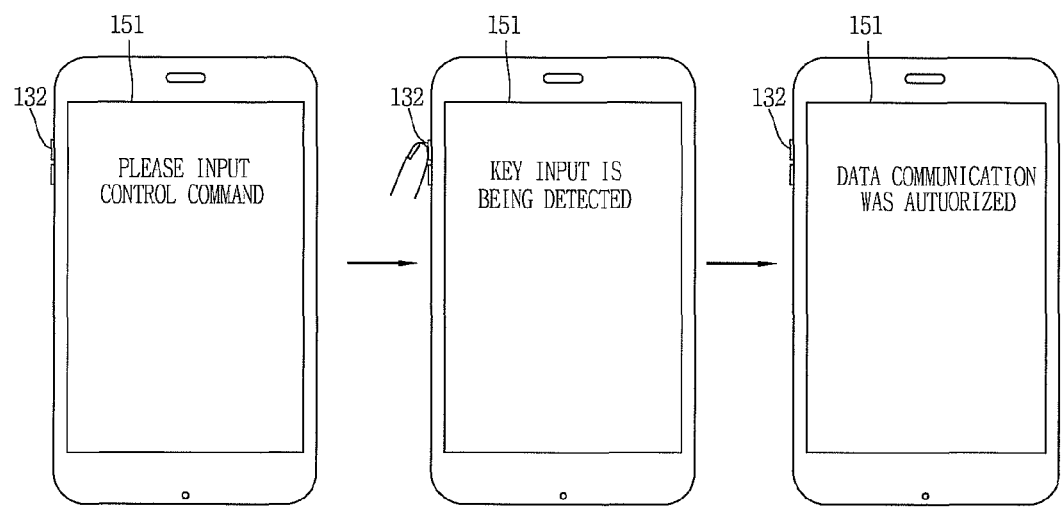
Figure 9D:
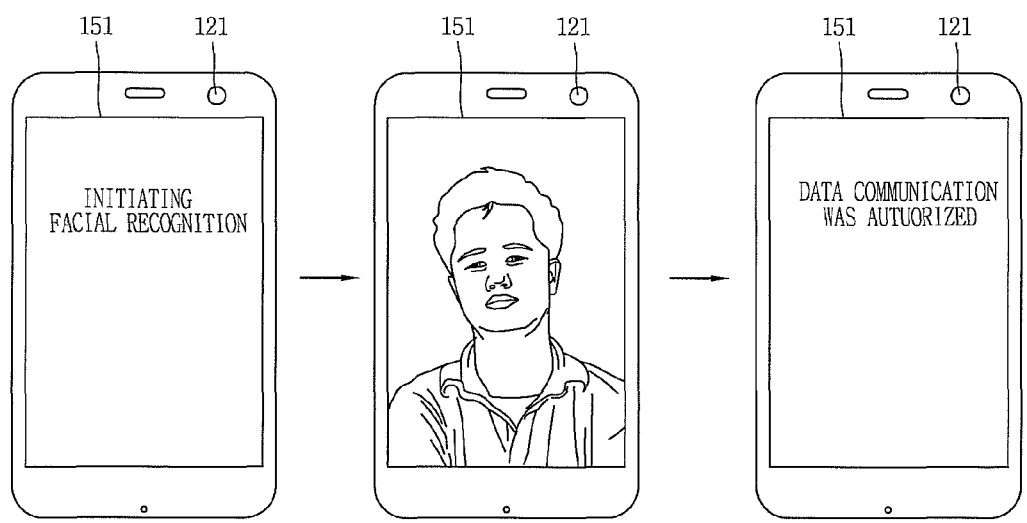

Referring to FIG. 9C, the control command may be input by using a volume key 132 of the mobile terminal. Once an object capable of performing short-range communication is recognized by the wireless communication unit 110, the controller 180 may display a notification prompting for a control command. In one embodiment, the notification or prompt may be generated without using the display, or while the display is turned off or is inactive such that the control command to authorize data transfer may be input without the need to view the display, as described in further detail hereinafter. Thereafter, the determination unit 181 may compare a key input signal input to the volume key 132 with a preset key input signal, thereby determining whether to allow data communication Referring to FIG. 9D, the control command may be input by using facial recognition. For example, once the wireless communication unit 110 recognizes the object 200 capable of performing short-range radio communication, the controller 180 activates the camera 121. Then, the controller 180 captures an image of a user's face using the camera 121, and the determination unit 181 compares the captured image with a preset image of the user's face. And, the determination unit 181 may determine whether to allow data communication or not based on a comparison result.

Figure 9E:
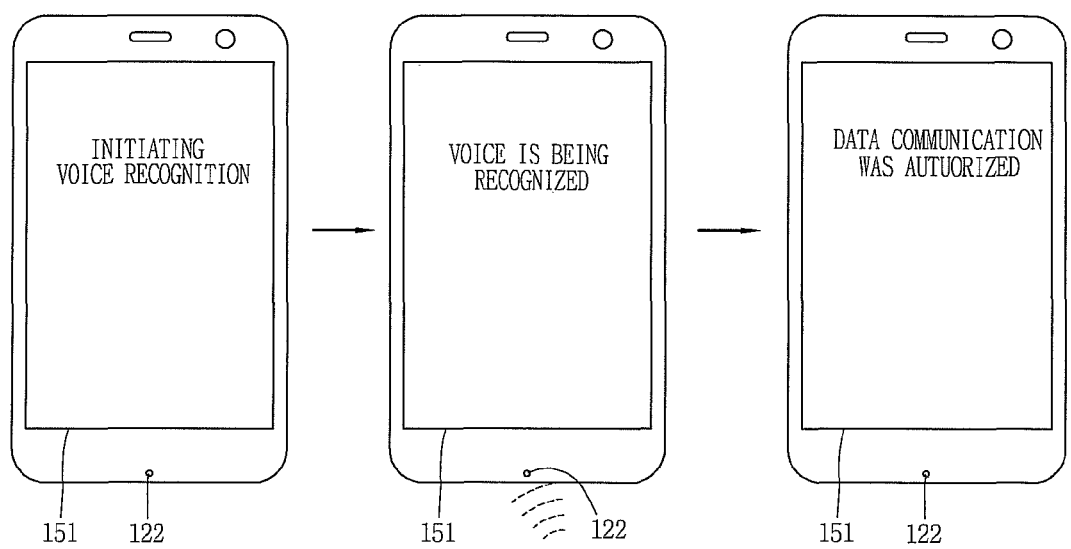

Referring to FIG. 9E, the control command may be input based on voice recognition. In this case, the controller 180 may active the microphone 122 to receive a voice input upon recognition of the object 200 capable of performing short-range radio communication. Once the voice sample input through the microphone 122 is recognized, the determination unit 181 may compare the recognized voice with a preset voice. Then, the determination unit 181 may determine whether to allow data communication or not based on a comparison result.

As aforementioned, in the present disclosure, whether to perform data communication can be determined in a simple manner such as a motion, facial recognition, voice recognition, key input and tagging, without the need of adjusting the mobile terminal in a complicated manner. This can enhance a user's convenience and improve data security.

In the mobile terminal of the present disclosure, if an object which can perform data communication is recognized using short range radio communication, a notification may be generated on the display to prompt a user for a control command. However, in various embodiments as broadly described hereinafter, the notification may be generated without the use of the display and a control command to authorize the data communication can be input from a user while the display 151 is inactive or turned off.

The inactive state of the display 151 may be a state in which the light source or lighting of the display 151 is turned off. The inactive state of the display may include a standby state. That is, while the display 151 is inactive, neither information nor graphic images are displayed on the display 151. In the mobile terminal of the present disclosure, a control command associated with data communication can be input without the use of the display, for example, while the display 151 is inactive or turned off. This can reduce power consumption required to turn on lighting of the display 151, by receiving a control command to authorize data communication, without activating the display. The user can also be alerted to and input a control command more quickly and easily.

Hereinafter, a method for receiving a control command while lighting of the display 151 is inactive will be explained in more detail, with reference to the attached drawings.

Figure 10:
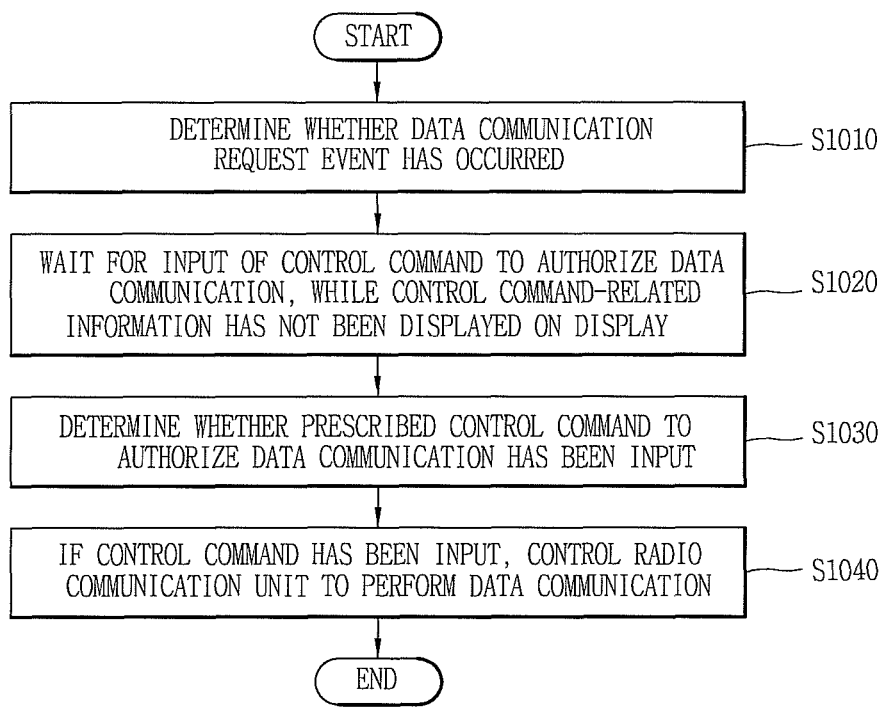
FIG. 10 is a flowchart of a method for controlling a mobile terminal according to one embodiment of the present disclosure.
Figure 11B:
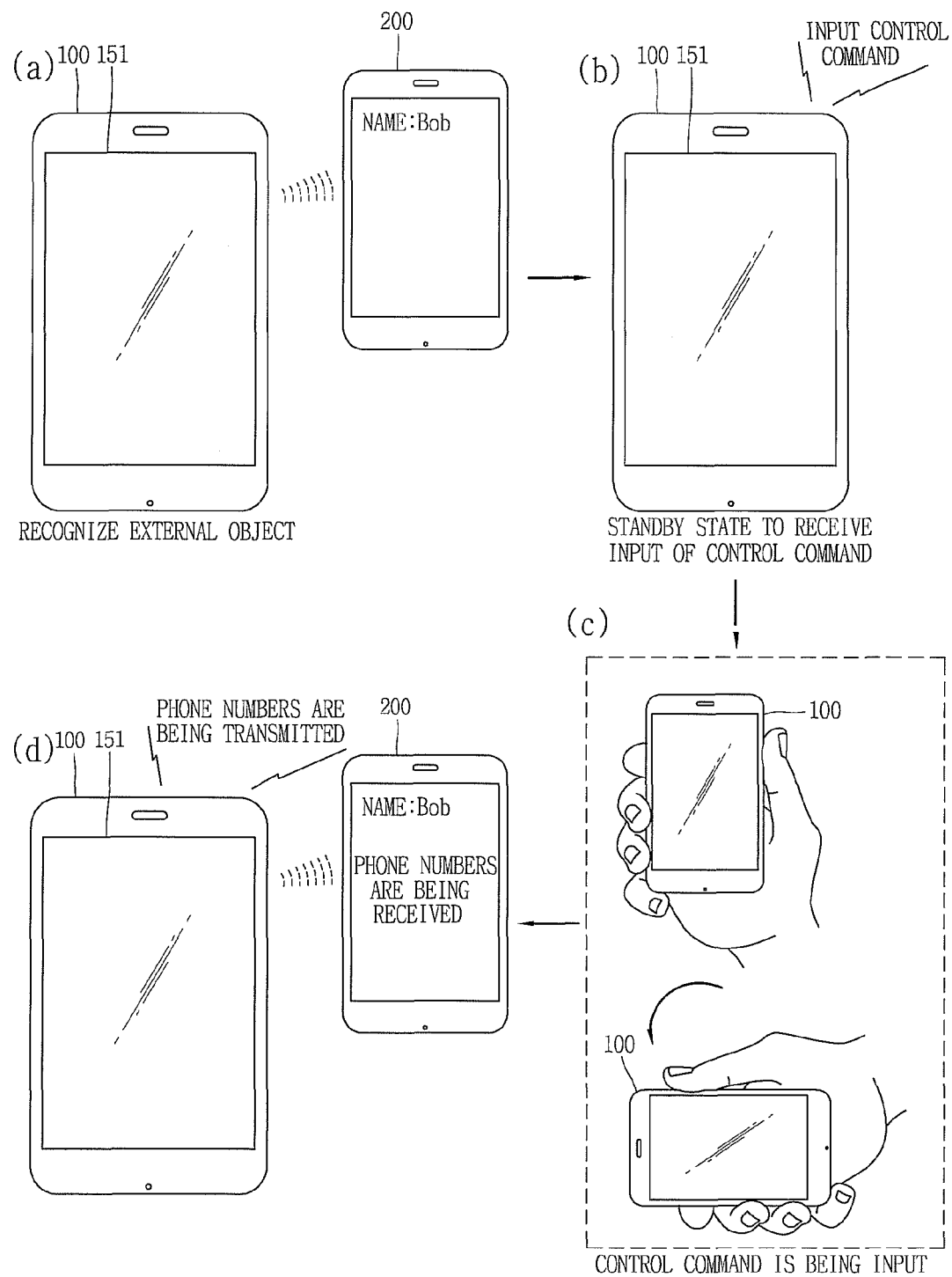
Figure 11C:
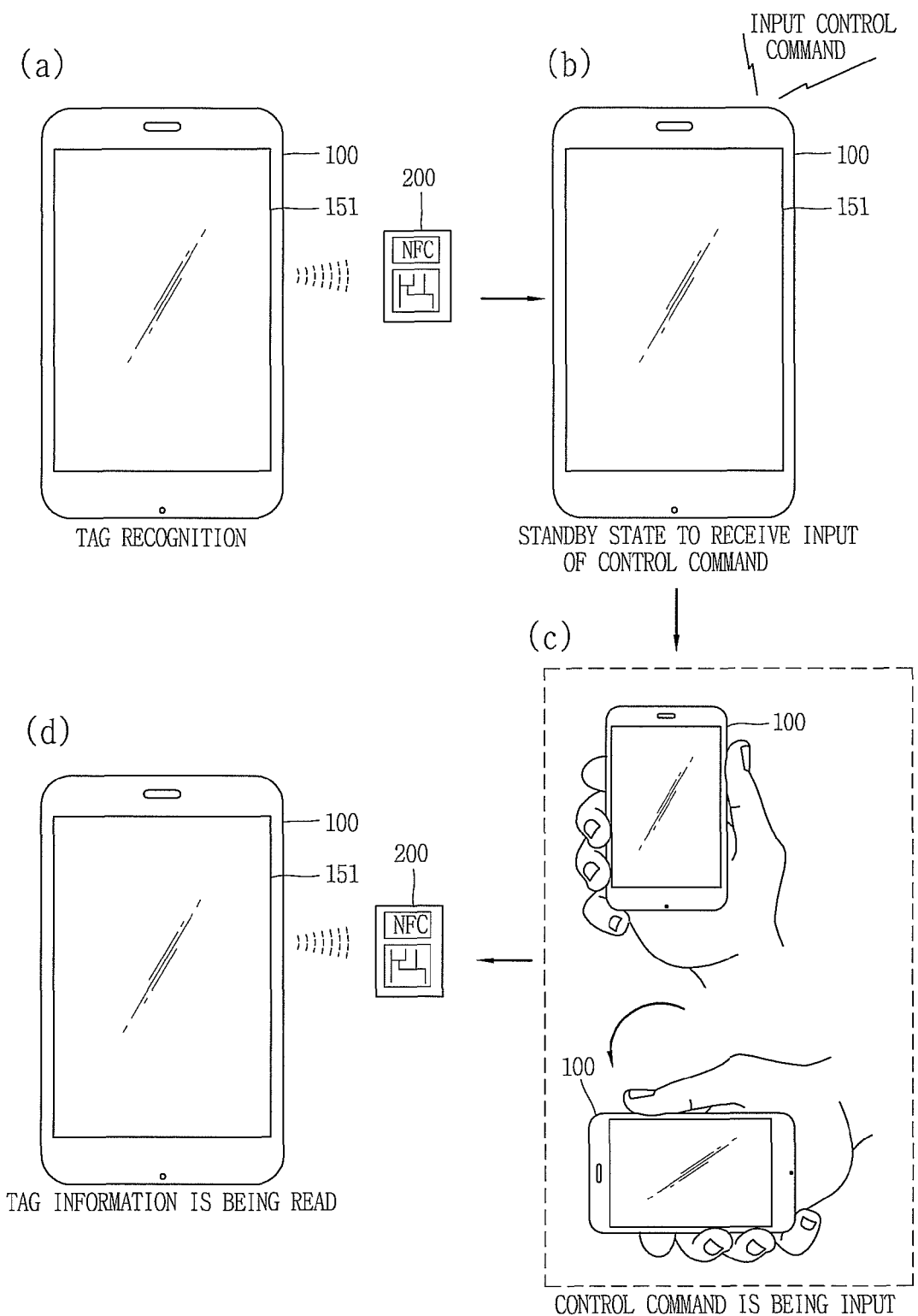

FIG. 10 is a flowchart of a method for controlling a mobile terminal according to one embodiment of the present disclosure, and FIGS. 11A to 11C are conceptual views illustrating a method for controlling a mobile terminal according to one embodiment of the present disclosure.

The controller 180 of the mobile terminal may determine whether a data communication request event has occurred, in step S1010. The data communication request event may occur by recognizing an external object which can perform short range radio communication, or by receiving a data communication request message from the external object. The data communication request message corresponding to the data communication request event may be received through the short range communication module 114 of the radio communication unit 110.

As illustrated in FIG. 11A, once a user moves the body 100 within a close proximity to an object 200 capable of performing short range radio communication (e.g., a payment terminal) so as to perform short range radio communication, the radio communication unit 110 may recognize the object 200. Recognition of the object 200 by the radio communication unit 100 may be the occurrence of a data communication request event. The object 200 may also recognize the mobile terminal using a short range radio signal.

If it is determined that a data communication request event has occurred, in step S1010, the controller 180 may wait for an input of a control command, in a case where control command-related information to authorize data communication has not been displayed on the display 151, in step S1020. That is, the controller 180 waits for reception of the control command while the display 151 is inactive or turned off.

The control command-related information may be a notification requesting an input of the control command. The controller 180 may output the notification requesting the input of the control command in the form of a sound, a vibration or the like, while the display 151 is turned off.

If a control command is received from the user in step S1020, the controller 180 may determine whether the received control command is a prescribed control command to authorize data communication with the object 200, in step S1030.

The control command may be used to authorize data communication between the radio communication unit 110 and the recognized object 200. The controller 180 may control the radio communication unit 110 to perform data communication with the object 200 only when a prescribed control command has been input.

In the embodiment of FIG. 3, whether a control command to authorize data communication has been input or not is determined by the determination unit 181. However, the controller 180 can perform the function of the determination unit 181 since the determination unit 181 is a component of the controller 180. Therefore, the configurations of the determination unit 181 and the controller 180 will not be individually explained in the following embodiments.

The control command may be implemented in various manners. For instance, the control command may be input through a movement of the body 100 (refer to FIG. 2A). That is, the control command can be input through a motion of the body 100. This can allow a user to input a control command in a simple manner, without using an additional key manipulation or an input to the display 151.

If the control command corresponds to a movement of the body 100, the sensing unit 140 senses the movement of the body 100. The sensing unit 140 may be configured to be activated only when the object 200 has been recognized. Once the object 200 is recognized by the sensing unit 140, the sensing unit 140 may continue to sense a position or orientation of the body 100 (e.g., degree of tilt or angle of incline) thus to obtain a movement pattern of the body 100.

Next, the controller 181 may compare the movement pattern of the body 100 sensed by the sensing unit 140 with a prescribed pattern to authorize data communication. If the sensed movement pattern is consistent with the prescribed pattern, the controller 181 may authorize the data communication. The prescribed pattern may be predefined by the controller 180, or may be set by a user's selection. The prescribed pattern may be an amount of rotation of the body 100 by a prescribed amount from any initial position (e.g., 90°) or a rotation of the body 100 to a prescribed angular position (e.g., positioned at a 90° incline).

As illustrated in FIG. 11A, once the object 200 is recognized by the radio communication unit 110, the controller 180 may wait for an input of a control command. And, a user may input a control command by moving the body 100. For instance, under an assumption that a prescribed pattern is to incline (rotate) the body 100 by about 90°, if the body 100 is inclined (rotated) by about 90°, the determination unit 181 may determine that a control command has been input.

The controller 180 may control lighting of the display 151 to be inactive, while waiting for an input of a control command. In this case, the controller 180 may output a notification requesting an input of a control command in the form of a sound, a vibration or another appropriate type of notification that does not require the display.

As aforementioned, if it is determined that a control command input to the body 100 authorizes data communication, the controller 180 may control the radio communication unit 110 to perform data communication with the object 200, in step S1040. For instance, if a control command input to the body 100 is a control command to authorize data communication, the controller 180 controls the radio communication unit 110 to perform data communication with the object 200.

On the contrary, if a control command input to the body 100 does not correspond to a prescribed control command to authorize data communication between the radio communication unit 110 and the object 200, e.g., if a sensed movement pattern of the body 100 does not correspond to a prescribed pattern, the controller 180 may control the radio communication unit 110 to prevent data communication with the object 200. That is, in the present disclosure, even if the object is recognized by the radio communication unit 110, data communication is not authorized when a prescribed control command has not been input, but may be authorized only when a prescribed control command has been input. For instance, under an assumption that a prescribed pattern is to incline (rotate) the body 100 by about 90°, the radio communication unit 110 may be configured to transfer data to the object 200 only when the body 100 is inclined by about 90°.

If the recognized object 200 is a card terminal (e.g., payment terminal), the mobile terminal of the present disclosure may perform a function of a card emulator, and the mobile terminal of the present disclosure can safely perform payment with the card terminal 200 through data communication. In this case, the mobile terminal may perform payment with the card terminal 200 by approaching to the object 200 by a prescribed distance and inputting a control command. The controller 180 may perform data communication for payment, or may output a notification requesting for an input of a control command, even while lighting of the display 151 is inactive (or turned off). In this case, the controller 180 may output information associated with a control command or payment, in the form of a sound (for example, voice) or another appropriate type of output that does not require the use of the display.

FIG. 11B illustrates a data communication method between the mobile terminal 100 and another terminal 200 using a P2P function. As aforementioned, the controller 181 may control information sharing to be performed between the terminals, only when a prescribed control command has been input. In this case, the controller 180 may be configured to not output a notification requesting for an input of a control command between the mobile terminal 100 and another terminal 200 on the display. For example, the display 151 of terminal 100 may be inactive or turned off during the data transfer process over short-range radio communication.

FIG. 11C illustrates the mobile terminal performing a reader function. As shown, the radio communication unit 110 of the mobile terminal 100 may read information stored in the object 200 having therein a microchip, e.g., information stored in a tag, or a sticker, or a card. In this case, the controller 180 may control the radio communication unit 110 to read information stored in the object 200, only when a prescribed control command has been input to the body.

The controller 180 may read information stored in the object 200 based on a control command received from a user, without unnecessarily converting a state of lighting of the display 151 to an 'ON' state from an 'OFF' state. As aforementioned, even if an object capable of performing short range radio communication is recognized by the radio communication unit 110, the controller 180 may be configured to not allow data communication between the radio communication unit 110 and the object, unless a control command which satisfies a prescribed condition is input. This can enhance security of data communication.

Furthermore, in the mobile terminal and the control method thereof according to the present disclosure, the lighting of the display 151 may be turned off (inactive) while the control command is being input or during the data transfer. This can reduce power consumption required to maintain lighting of the display 151 in an 'ON' (active) state as well as improve user interaction by eliminating the need to view the display.

In the aforementioned embodiment, whether a control command has been input or not is described as being determined by the controller 180 when the object is recognized by the radio communication unit 110. However, the controller 180 can determine whether a control command has been input or not, based on a setting to determine whether a control command has been input or not in a settings menu. This will be explained in more details with reference to the attached drawings.

FIG. 12 is a conceptual view illustrating a method for storing a control command setting in a mobile terminal according to one embodiment of the present disclosure. The controller 180 may determine whether a control command to authorize data communication is required, in the occurrence of the aforementioned data communication event. If it is determined that the mobile terminal has not been set to require a control command, the controller 180 authorizes data communication between the recognized object 200 and the radio communication unit 110.

On the other hand, if the mobile terminal has been set to recognize the object 200 and to receive a control command, the controller 180 waits for an input of a control command from a user. Once a control command has been input, the controller 180 may determine whether the input control command corresponds is a valid control command that authorizes data communication (e.g., the pattern matches a pre-stored pattern). When the controller 180 waits for an input of a control command, the lighting of the display 151 may be in an 'OFF' state. Moreover, the controller 180 may output a notification requesting for an input of a control command in the form of a sound (e.g., voice), a vibration, or another appropriate type of indication that does not require the display.

Only in a case where a user has set a setting for "input of a control command into the body" through a setting menu, whether a control command has been input or not can be determined. If it is set to input a control command to the mobile terminal, only when an input control command authorizes data communication, can data communication be performed between the object 200 and the radio communication unit 110. Whether to input a control command or not (e.g., require control commands to authorize data transfer) may be changed by a user's setting.

In this embodiment, a control command may be required to transfer data and the controller 180 may determine whether the input control command corresponds to one that authorizes data transfer when the data to be transmitted/received satisfies a prescribed condition. For instance, a user may set a control command to be required according to a type of specific data, a type of a communication channel, a type of an application, a payment-related communication, whether encryption has been performed or not, whether personal information included in a Universal Subscriber Identity Module (USIM) has been used or not, or another appropriate criteria. Such settings may be provided for the protection of data, particularly when the data security is important. If a control command has not been input from a user, information leakage to the outside, e.g., to the object 200 can be prevented.

Setting whether to require a control command with respect to a prescribed condition may be performed by the controller 180 or a user. If it is determined whether to input a control command or not only when data to be transmitted/received satisfies a prescribed condition, the controller 180 may analyze the data to be transmitted/received. If the analyzed data satisfies the prescribed condition, the controller 180 may require a control command to prior to authorizing data transfer and determine whether a control command has been input.

For instance, the controller 180 may determine whether a control command has been input to the body 100 only when data transmitted/received between the object 200 and the radio communication unit 110 is personal information or privacy-related information. The personal information or privacy-related information may include payment information, address information, message information, mail information, photos, moving images, memos, a diary, or another appropriate type of data.

If data to be transmitted/received between the recognized object 200 and the radio communication unit 110 is personal information or privacy-related information, the controller 180 may determine whether a control command has been input to the body 100. If the data satisfies the above condition or if it is set to always require a control command, the controller 180 may determine whether a control command has been input to the body 100 (e.g., wait for the control command to be input authorizing data transfer).

Once an input of a control command is set by a user or the controller 180, the controller 180 may determine whether a control command has been input to the body 100. If it is determined that the received control command corresponds a previously stored control command for authorizing data communication, the controller 180 may control the radio communication unit 110 to perform data communication with the recognized object 200.

If it is set, by a user or the controller 180, that data communication between the radio communication unit 110 and the object 200 can be performed without an input of a control command, the controller 180 controls the data to be transferred between the object 200 and the radio communication unit 110. Then, the controller 180 may set a control command after completion of the data communication.

The reason is in order to prevent data communication from being performed at random without security, in a case where data to be transmitted/received through short range radio communication is critical. After data communication between the object 200 and the radio communication unit 110 is completed, the controller 180 may output a notification requesting for an input of a control command. More specifically, for subsequent short range radio communication, it may be set to input a control command to the mobile terminal, and to determine whether the input control command authorizes data communication.

As shown in (a) of FIG. 12, the controller 180 controls the display 151 to maintain an inactive state during data communication. On the other hand, as shown in (b) of FIG. 12, the controller 180 converts the inactive state of the display 151 to an activated state when the data communication is terminated. Then, the controller 180 may control the display of a guide information for setting a control command for subsequent data communication. For instance, upon completion of the data communication, the controller 180 may output to the display 151 a notification, for example, "Would you like to set a control command?".

As shown in (c) of FIG. 12, once a button for setting a control command is selected by a user, the controller 180 may output a list of control commands which can be input. If one of the control commands which can be input is selected by the user, e.g., 'motion' is selected, the user than moves the body of the mobile terminal 100 in a motion to be set as the control command, as illustrated in (d) of FIG. 12.

More specifically, if the user moves the body 100 in a prescribed pattern, the sensing unit 140 may sense the movement pattern of the body 100. And, the controller 180 may store the movement pattern as a control command. If the movement pattern is stored as a control command, data communication can be performed during subsequent short range radio communication only when a control command that corresponds to the pattern of this stored movement pattern is input. The controller 180 may differently set whether to input a control command, according to a data type, an application type, a type of an object to be recognized, etc.

As aforementioned, in the mobile terminal and the control method thereof according to the present disclosure, it may be set to input or require a control command only when data to be transmitted/received satisfies a prescribed condition. This can prevent an unnecessary input of a control command. Furthermore, in the mobile terminal and the control method thereof according to the present disclosure, it may be set to input a control command after completion of data communication. This can reduce a user's inconvenience in accessing the settings menu.

FIG. 13 is a conceptual view that illustrates a method for outputting a notification requesting for an input of a control command applied to a mobile terminal according to one embodiment of the present disclosure. In this embodiment, a notification may be output requesting for an input of a control command when a control command has not been input for a prescribed time, even if it is set to input a control command to the mobile terminal.

As illustrated in FIG. 13, once the radio communication unit 110 of mobile terminal 100 recognizes the object 200 capable of performing radio communication, e.g., in the occurrence of a data communication event, the controller 180 may wait for an input of a control command while controlling the display 151 to maintain an 'OFF' state. If no control command has been input from a user for a prescribed time, the controller 180 may output a notification requesting for an input of a control command.

As illustrated in (b) of FIG. 13, the notification may be output in the form of a sound via a speaker, or in the form of a vibration via the body, while the display 151 is inactive. Here, the sound and vibration may be output simultaneously or separately.

A standby time period for an input of a control command may be set by a user. As illustrated in (c) of FIG. 13, if no control command has been input after a prescribed amount of time has elapsed, the controller 180 may control data communication between the radio communication unit 110 and the recognized object 200 not to be performed.

More specifically, even if a short range radio signal is transmitted to the radio communication unit 110 from the object 200, due to a change of a magnetic flux occurring from the periphery of the body 100 by the object 200, the controller 180 may not process the radio signal transmitted from the object 200. Rather, the controller 180 may terminate a preparation process for data communication.

Figure 14:
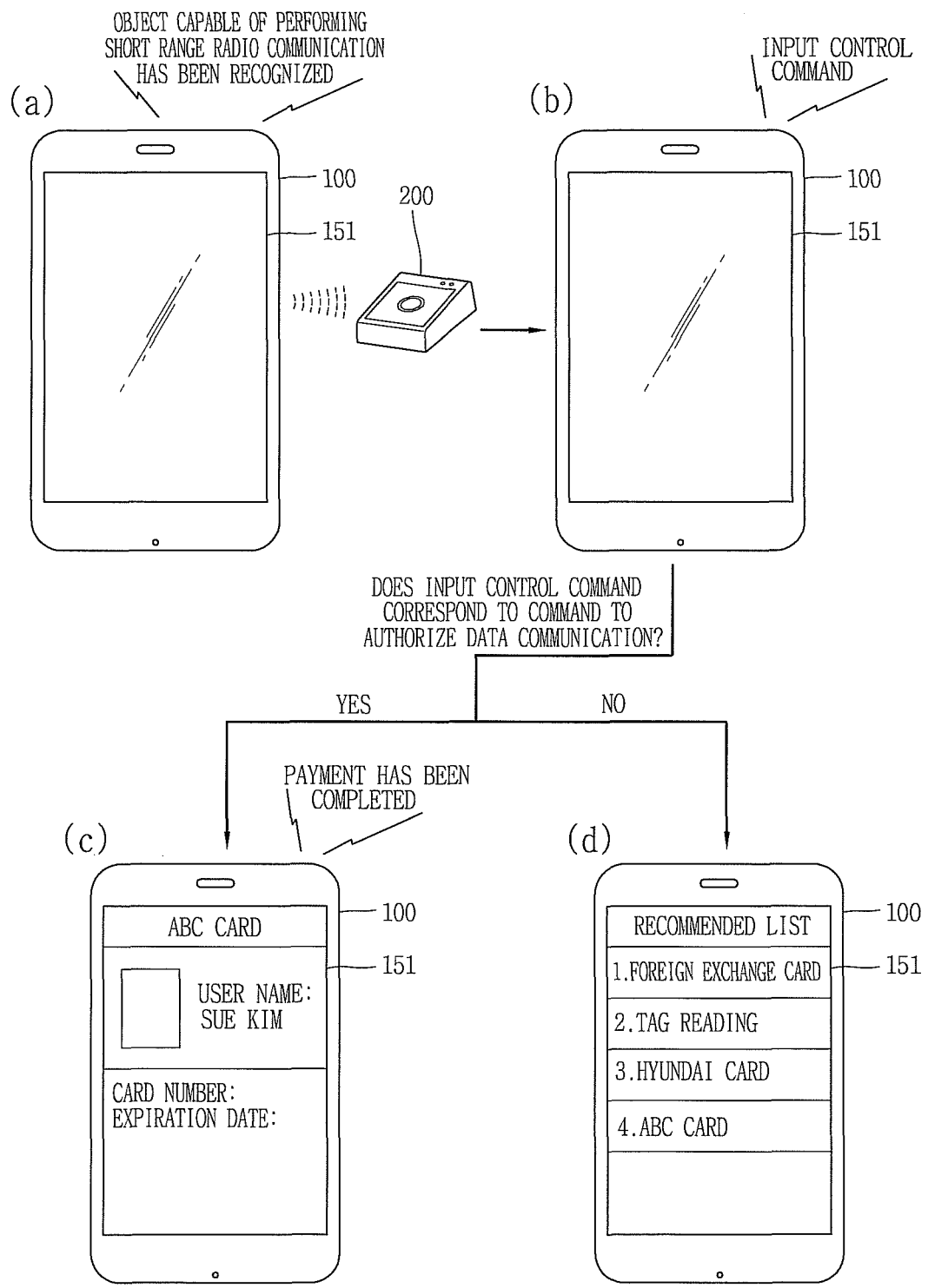
FIG. 14 is a conceptual view that illustrates a method for controlling a mobile terminal based on a received control command according to one embodiment of the present disclosure.

FIG. 14 is a conceptual view that illustrates an execution screen according to a control command applied to a mobile terminal according to one embodiment of the present disclosure. In the aforementioned embodiments, a control command may be input from a user in correspondence to a data communication request event. Then, it may be determined, by the controller 180, whether the input control command is a control command to authorize data communication. According to a determination result, a different process may be performed.

For instance, if a control command input from a user authorizes data communication between the radio communication unit 110 and the recognized object 200, the controller 180 may control data communication between the radio communication unit 110 and the recognized object 200 to be performed. In this case, the controller 180 may analyze authentication information received from the recognized object 200, or may analyze prescribed information of each object. Then, the controller 180 may activate an application required to perform data communication between the radio communication unit 110 and the object 200, based on the analyzed information.

As illustrated in (c) of FIG. 14, if a control command input from a user is a control command that authorizes data communication, the controller 180 may activate an application to be used for data communication, based on authentication information prescribed or received from the object 200.

In the present disclosure, "activating an application" may refer to executing a specific application, and performing data communication using the executed application, or may refer to enabling data communication using an application being executed.

For instance, if the object 200 (e.g., card terminal or payment terminal) is recognized by the radio communication unit 110, the controller 180 may execute an 'ABC card' application based on a user's setting or authentication information. Then, the controller 180 may control data communication between the radio communication unit 110 and the object 200 to be performed. The controller 180 may control the radio communication unit 110 to perform data communication with the object 200, by executing the 'ABC card' application, without turning on lighting of the display 151.

If a control command input from a user does not allow data communication with the object 200 (e.g., an incorrect or unknown control command was entered), the controller 180 may analyze a type of the object 200, and may detect an application corresponding to the object type and using short range radio communication. Then, the controller 180 may display a list of the detected applications on the display 151, as illustrated in (d) of FIG. 14. This can allow the user to know information regarding usable applications even if a control command has not been correctly input.

FIGS. 15A to 15E are conceptual views that illustrate a control command which can be input to a mobile terminal according to an embodiment of the present disclosure. In the aforementioned embodiments, a control command may be input through a movement of the body. However, a control command can be input in simple and various manners, not through a movement of the body.

A type of the control command may be variously selected and stored through a setting menu. As aforementioned, when the control command is input to the body, the display 151 may be deactivated. That is, the control command can be input to the body when lighting of the display 51 is in an 'OFF' state. And, guide information associated with the control command may be provided to a user in the form of a sound (or voice) or a vibration.

Figure 15A:
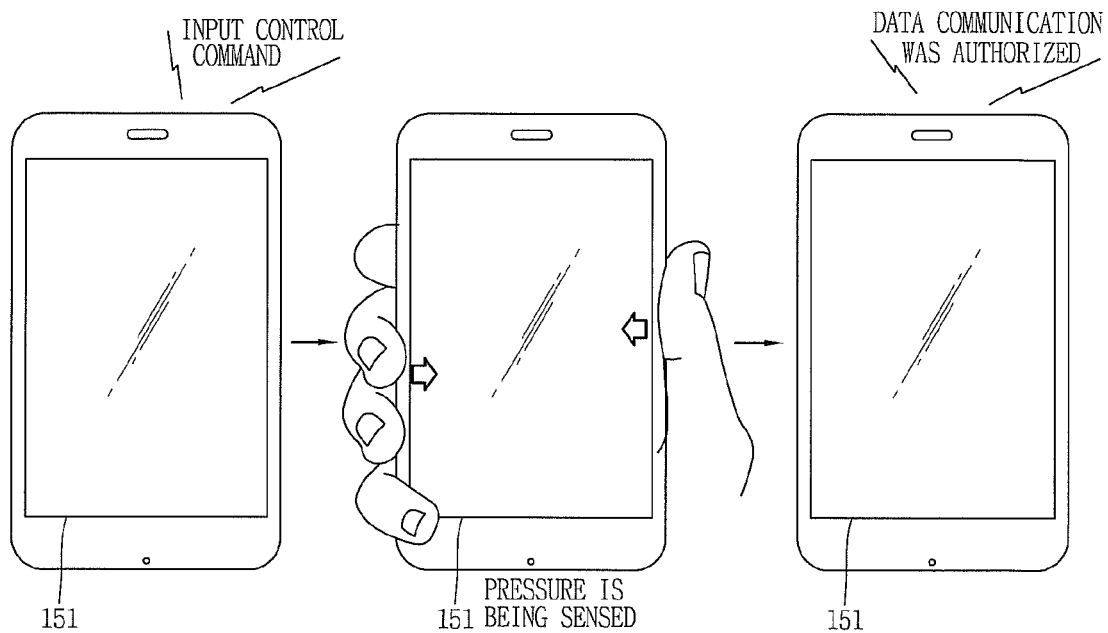
FIGS. 15A to 15E are conceptual views that illustrate a method for inputting control command at a mobile terminal according to one embodiment of the present disclosure.

As an example, as illustrated in FIG. 15A, the controller 180 may set a control command by sensing a pressure applied to the mobile terminal by the sensing unit 140. A pressure sensor of the sensing unit 140 can sense the degree (e.g., magnitude and/or duration, etc.) of a pressure or force applied to the mobile terminal, and can sense the degree of grasping power applied to the terminal. Therefore, the degree of grasping power applied to the mobile terminal, the number of times, a pattern, etc. may be utilized as a control command.

In the occurrence of a data communication request event, the controller 180 may output a notification requesting for an input of a control command in the form of a sound or a vibration. If a user applies a pressure having a prescribed value to the mobile terminal, the controller 180 may recognize the pressure as a control command.

And, the controller 180 may determine whether the pressure applied to the mobile terminal corresponds to a prescribed control command, and may authorize (allows) data communication according to a determination result.

Figure 15B:
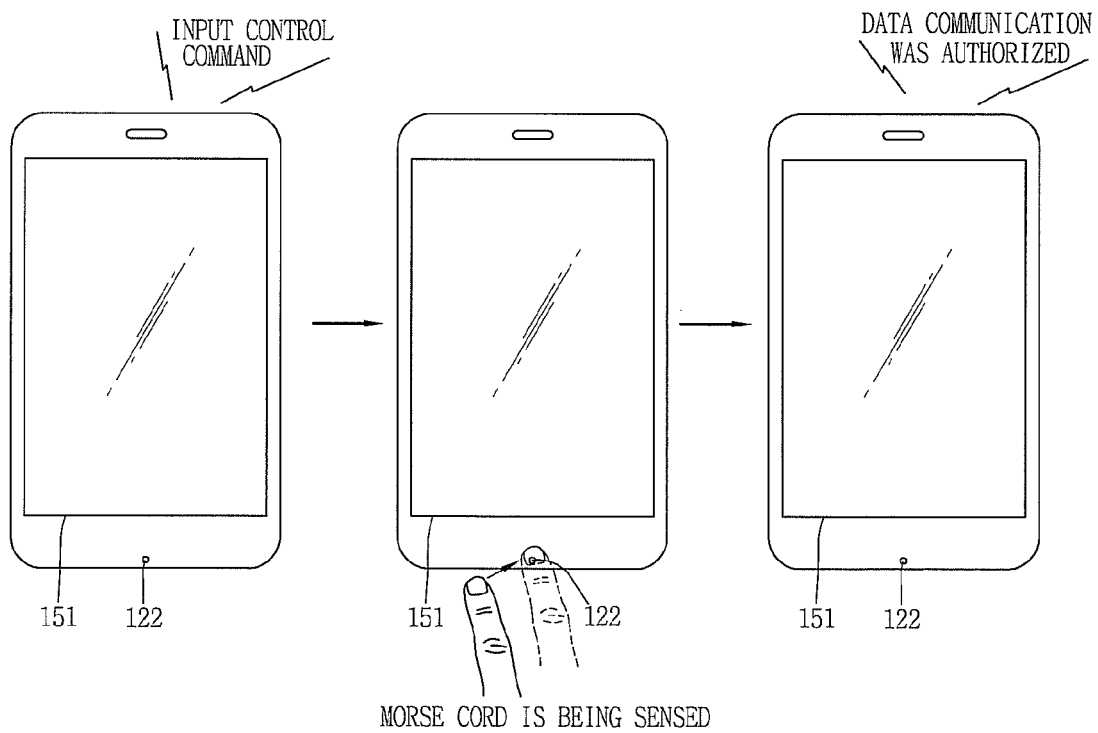

Next, as illustrated in FIG. 15B, the controller 180 may set a control command using Morse code. That is, a control command may be input by consecutively inputting tagging with a specific beat to the microphone 122 or an illumination sensor.

If a data communication request event occurs from the mobile terminal, the controller 180 may output a notification requesting for an input of a control command. Once tagging with a specific beat has been input to the microphone 122 or an illumination sensor, the controller 180 may recognize the tagging as a control command.

The notification may be output in the form of a sound or a vibration while the display 151 is inactive. And, the determination unit 181 may determine whether the tagging with a specific beat corresponds to a prescribed control command, and may authorize (allow) data communication according to a determination result.

Figure 15C:
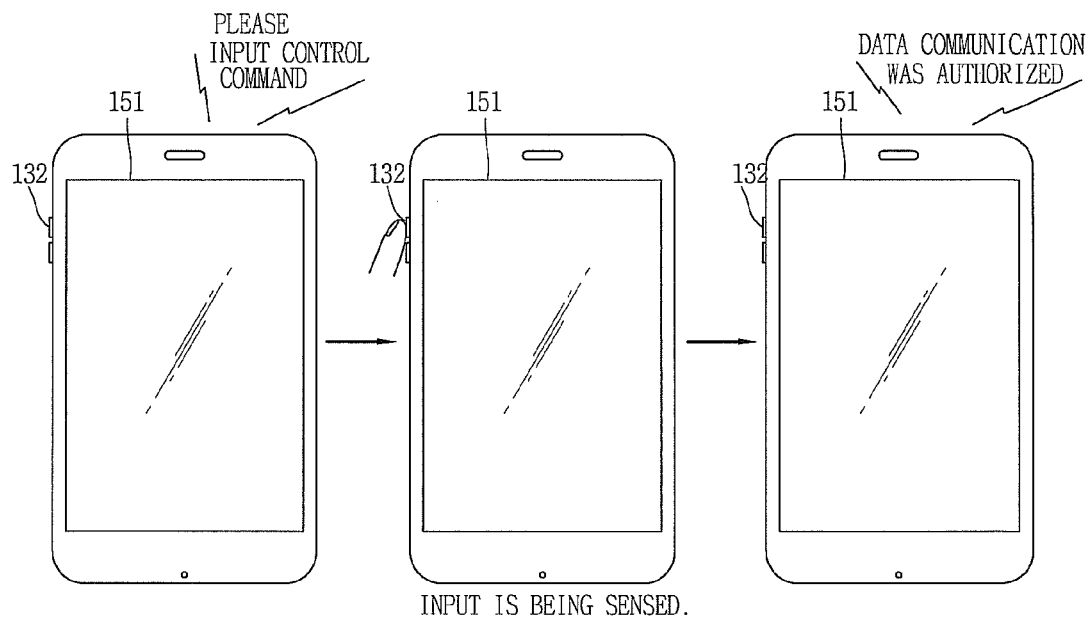

As illustrated in FIG. 15C, the control command may be input by using a volume key 132, or another appropriate button, of the mobile terminal. If a data communication request event occurs from the mobile terminal, the controller 180 may output a notification requesting an input of a control command. Then, the controller 180 may compare a key input signal applied to the mobile terminal by using the volume key 132 with a prescribed key input signal, thereby determining whether to allow data communication.

Figure 15D:
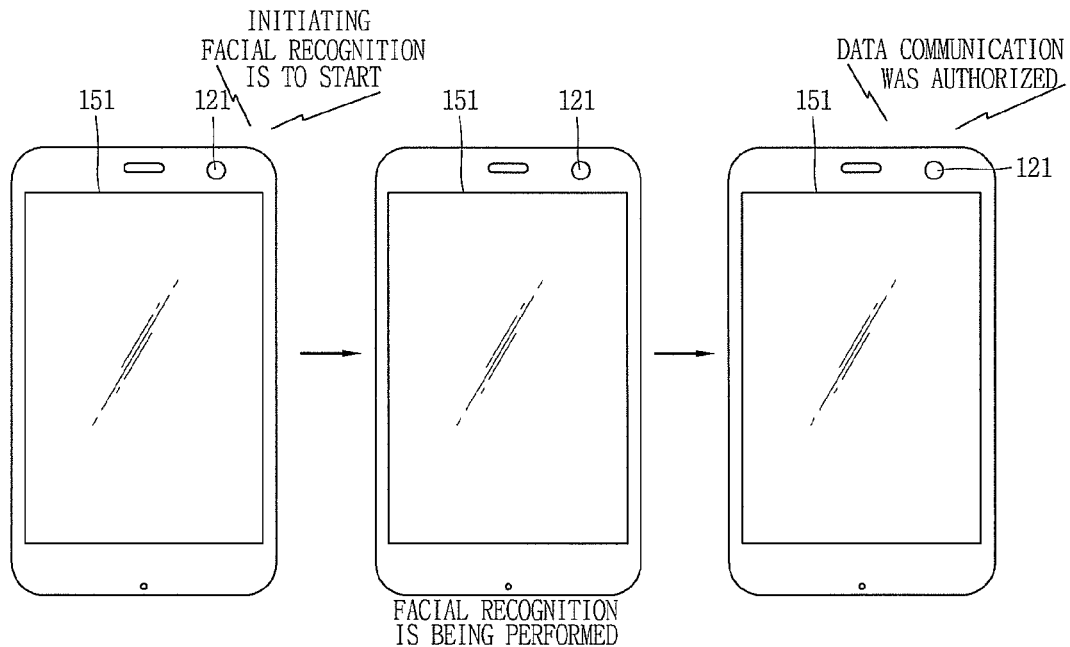

As illustrated in FIG. 15D, the control command may be input through facial recognition. For instance, if a data communication request event occurs, the camera 121 may be activated. And, the controller 180 may capture an image of a user's face using the camera 121, and may compare the recognized facial image with a pre-stored facial image. Then, the controller 180 may determine whether to allow data communication based on a comparison result. Here, the controller 180 may output a notification requesting for an input of a control command. The notification may be output in the form of a sound or a vibration while the display 151 is inactive or turned off.

Figure 15E:
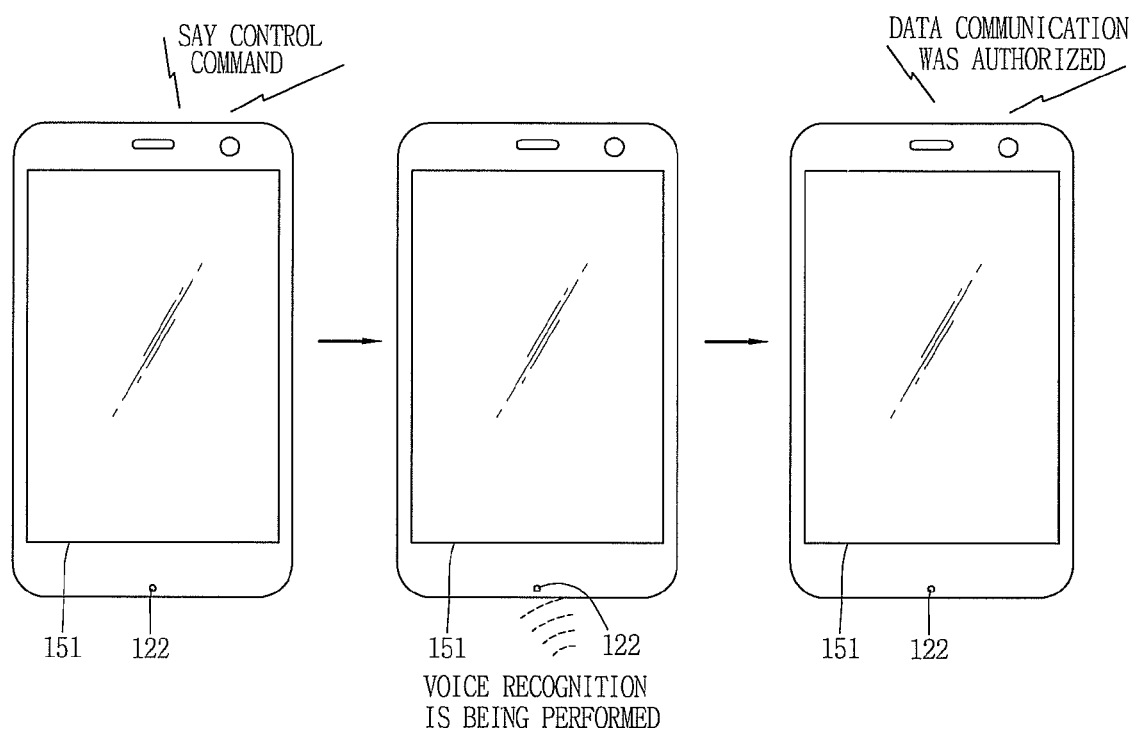

As illustrated in FIG. 15E, the control command may be input by using voice recognition. In this case, once the object 200 capable of performing short range radio communication is recognized, the controller 181 may activate the microphone 122 for a voice input. Upon recognition of the voice input to the microphone 122, the controller 180 may compare the recognized voice with a pre-stored voice sample. Then, the controller 180 may determine whether to allow data communication based on a comparison result. Here, the controller 180 may output a notification requesting an input of a control command. The notification may be output in the form of a sound or a vibration while the display 151 is inactive or turned off.

The mobile terminal of the present disclosure may have the following advantages:

Firstly, determining in a simple manner whether to perform data communication using various inputs, such as a sensed motion of the mobile terminal, facial recognition, voice recognition, key input and tagging, or the like, without the need to manipulate or control the mobile terminal in a complex manner. This may enhance a user's convenience and improve data security.

Secondly, if a specific control command is not input after an object capable of performing short-range radio communication has been recognized, data communication may be restricted. This can restrict data from being shared at random and without user consent.

Thirdly, the determination as to whether data should be transferred over short-range radio communication may be controlled through a motion pattern of the mobile terminal. This may allow a user to control data transfer over a short-range radio communication function using a simple and quick manipulation of the mobile terminal.

Fourthly, a control command to authorize data communication can be input without activating the display. Therefore, a control command can be input even while lighting of the display is turned off. This can reduce power consumption required to turn on the lighting of the display.

In one embodiment, a mobile terminal may include a body, a display, a transceiver for short range radio communication, and a controller configured to control data transfer through the transceiver. The controller may be configured to determine whether a request for data transfer is received, determine whether an input is required to authorize the data transfer, and determine whether the data transfer is authorized. The controller may transfer data through the transceiver when the data transfer is authorized and the input may be received without displaying a prompt on the display for the input.

In this embodiment, the input may be received while the display is inactive or turned off. The controller may determine whether the input is required to authorize the data transfer based on at least one of a data type, a type of communication channel, an application program associated with the requested data, whether the request for data is a request for payment information, or whether data encryption is necessary. Moreover, the controller may be configured to determine a type of data requested in the request for data, and may determine that the input is required to authorize the data transfer when the type of data requested is private information.

The mobile terminal may further include a camera to capture an image of a user for facial recognition, wherein the input to authorize the data transfer is based on the facial recognition. The mobile terminal may include a microphone to capture sounds for voice recognition, wherein the input to authorize the data transfer is based on the voice recognition. The mobile terminal may include a sensor to detect a movement of the mobile terminal, and wherein the input is a prescribed movement of the body of the mobile terminal.

The prescribed movement of the body of the mobile terminal may be one of shaking motion or a rotation of the body by a prescribed amount. The input may be an application of a prescribed amount of pressure on the body of the mobile terminal. When the input is not received after a prescribed amount of time after the controller determines that the input is required to authorize the data transfer, the controller may generate a notification requesting the input.

In this embodiment, the controller may be configured to initiate an application program associated with the request for data when the data transfer is authorized. When the input is not recognized as an input to authorize the data transfer, the controller may detect a type of the requested data and generates a display of a list of application programs associated with the requested data type for processing the requested data. When the controller determines that the input is not required to authorize the data transfer, the controller transfers the data through the transceiver. After transferring the data that does not require an input authorizing data transfer, the controller may be configured to display a user interface for associating an input with the transferred data in order to authorize subsequent data transfers.

The associated input may be a movement of the body of the mobile terminal according to a predefined movement pattern and is input through the user interface, and the controller associates the received movement to the type of data transferred.

In one embodiment, a mobile terminal may include a body, a display, a transceiver for short range radio communication, and a controller configured to control data transfer. The controller may be configured to determine whether a request for data transfer is received, determine whether an input is required to authorize the data transfer, the input being a prescribed movement of the body of the mobile terminal, and determine whether the data transfer is authorized, and transfers data through the transceiver when the data transfer is authorized, wherein the input is received while the display is inactive. The prescribed movement may be a rotation of the body of the mobile terminal at least 90° degrees. The prescribed movement may also be a shaking motion.

In one embodiment, a mobile terminal may include a body, a display, a transceiver for short range radio communication, and a controller configured to control data transfer. The controller in this embodiment may be configured to determine whether a request for data transfer is received, determine whether an input is required to allow the data transfer, the input being an application of a prescribed amount of force on the mobile terminal, and determine whether the data transfer is authorized, and transfers data through the transceiver when the data transfer is authorized, wherein the input is received without displaying a request for the input on the display. In this embodiment, the prescribed amount of force may be applied on a side surface of the body of the mobile terminal.

As embodied and broadly described herein, a mobile terminal, may include a mobile terminal body, a wireless communication unit configured to recognize an object capable of performing short-range radio communication using a short-range radio signal, a determination unit configured to determine whether a control command input to the mobile terminal body is a command allowing data transception with the recognized object, and a controller configured to control data transception with the object through the short-range radio communication.

In one embodiment, the determination unit may be configured to execute the determination only when the data to be transceived satisfies a preset condition.

In one embodiment, the preset condition may include at least one of a data type, a communication channel type, application information, payment information and whether encryption has been performed or not.

In one embodiment, the controller may analyze a type of the data to be transceived with the object based on the short-range radio signal, and control the determination unit to determine the control command if the data is privacy-related information.

In one embodiment, the control command may be input through motion of the mobile terminal body, and the motion of the mobile terminal body may be detected by a sensing unit.

In one embodiment, the sensing unit may be activated only when the object is recognized.

In one embodiment, upon detection of motion of the mobile terminal body by the sensing unit, the determination unit may compare the detected motion pattern with a preset pattern allowing data transception. If the detected motion pattern corresponds to the preset pattern, transception of the data may be allowable.

In one embodiment, if a standby time for inputting the control command lapses in a state where no control command has been input, the controller may output inducement information for inducing input of the control command.

In one embodiment, the wireless communication unit may be configured to receive the short-range radio signal based on magnetic flux change around the mobile terminal body. If the control command has not been input for a preset time, the controller may not process the short-range radio signal.

In one embodiment, if the control command input to the mobile terminal body is a command allowing data transception, an application preset to correspond to the recognized object may be activated so that the data can be transceived by using the application.

In one embodiment, if the control command input to the mobile terminal body is not a command allowing data transception, a type of the recognized object may be analyzed, and a list of applications corresponding to the object type and using the short-range radio communication may be output.

In one embodiment, the determination unit may be activated based on a user's setting. When the determination unit is non-activated, the controller may control the wireless communication unit so as to immediately transceive the data with the recognized object.

In one embodiment, the controller may output inducement information for inducing activation of the determination unit after the data transception is terminated.

In one embodiment, the control command may correspond to motion of the mobile terminal body, and if the determination unit is activated, the controller may store a motion pattern of the mobile terminal body corresponding to the user's input, and set the pattern as the control command.

In one embodiment, the control command may be input through pressure applied to the mobile terminal body, and the pressure applied to the mobile terminal body may be detected by a sensing unit.

As embodied and broadly described herein, a method for controlling a mobile terminal may include recognizing an object capable of performing short-range radio communication, using a short-range radio signal, determining whether a control command allowing data transception with the recognized object has been input, and transceiving the data with the object through the short-range radio communication, based on a result of the determination.

In one embodiment, the control command may correspond to a motion pattern of a mobile terminal body. In the determination step, it may be determined whether a motion pattern input to the mobile terminal body corresponds to a preset pattern. In the transception step, if the motion pattern input to the mobile terminal body corresponds to the preset pattern, transception of the data with the object may be allowable.

In one embodiment, in the determination step, it may be determined whether motion of the mobile terminal body has been sensed for the preset standby time. If the preset standby time lapses in a state where no motion has been detected, inducement information for inducing motion of the mobile terminal body may be output.

The aforementioned method may be implemented as a program code stored in a computer-readable storage medium. The storage medium may include ROM, RAM, CD-ROM, a magnetic tape, a floppy disc, an optical data storage device, etc. And, the storage medium may be implemented as carrier wave (transmission through the Internet). The computer may include the controller of the mobile terminal.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
a body;

a sensing unit;
a display;
a transceiver for short range radio communication; and
a controller configured to control data transfer through the transceiver, wherein the controller is configured to set a movement of the body by a user sensed by the sensing unit as a preset motion for authorizing the data transfer, sense, via the sensing unit, a motion of the body in a state where the display unit is turned off in response to an object being recognized via the transceiver, and
perform, via the transceiver, the data transfer with the object in the state where the display unit is turned off and the motion of the body sensed by the sensing unit matches the preset motion of the body authorizing the data transfer, the preset motion of the body including a motion pattern of the body of the mobile terminal,
wherein, when the preset motion is not sensed as an input to authorize the data transfer, the controller detects a type of target data of the data transfer and generates a display of a list of application programs associated with the target data type for processing the requested data.

2. The mobile terminal of claim 1, wherein the controller determines whether the motion is required to authorize the data transfer based on at least one of a data type, a type of communication channel, an application program associated with the requested data, whether the request for data is a request for payment information, or whether data encryption is necessary.

3. The mobile terminal of claim 1, wherein the controller is configured to determine a type of data requested in the request for data, and determines that the motion is required to authorize the data transfer when the type of data requested is private information.

4. The mobile terminal of claim 1, wherein the preset motion of the body of the mobile terminal is one of shaking motion or a rotation of the body by a prescribed amount.

5. The mobile terminal of claim 1, wherein the controller is configured to initiate an application program associated with data transfer related to the object when the data transfer is authorized.

6. The mobile terminal of claim 1, wherein the controller is further configured to determine whether a request for the data transfer is received, determine whether the preset motion is required to authorize the data transfer, and determine whether the data transfer is authorized, and transfer data through the transceiver when the data transfer is authorized, wherein, when the controller determines that the preset motion is not required to authorize the data transfer, the controller transfers the data through the transceiver.

7. The mobile terminal of claim 6, wherein, after transferring the data that does not require the preset motion authorizing the data transfer, the controller is configured to display a user interface for associating a motion with the transferred data in order to authorize subsequent data transfers.

8. The mobile terminal of claim 7, wherein the associated motion is a rotation of the body at a specific angle and is input through the user interface, and the controller associates the associated motion to the type of data transferred.

9. A mobile terminal, comprising: a body; a sensing unit; an audio output unit; a display; a transceiver for short range radio communication with an object; and a controller configured to control data transfer, wherein the controller is configured to control the audio output unit to output a notification sound when the object is recognized via the transceiver, wherein the notification sound is output in a state where the display unit is turned off, sense, via the sensing unit, a motion of the body in the state where the display unit is turned off, wherein an operation of short range radio communication with the object is terminated if the motion of the body is not sensed for a preset amount of time, and perform, via transceiver, the data transfer with the object in the state where the display unit is turned off and the motion of the body sensed by the sensing unit matches a preset motion of the body authorizing the data transfer, the preset motion of the body including a motion pattern of the body of the mobile terminal.

10. The mobile terminal of claim 9, wherein the preset motion is a rotation of the body of the mobile terminal at least 90° degrees.

11. The mobile terminal of claim 9, wherein the preset motion is a shaking motion.

12. The mobile terminal of claim 1, wherein the controller compares the motion of the body sensed by the sensing unit to the preset motion of the body to determine whether the data transfer is authorized.

13. The mobile terminal of claim 9, wherein the controller compares the motion of the body sensed by the sensing unit to the preset motion of the body to determine whether the data transfer is authorized.

14. A mobile terminal, comprising:
a body;
a sensing unit;
a display;
a transceiver for short range radio communication; and
a controller configured to control data transfer through the transceiver, wherein the controller is configured to
set a movement of the body by a user sensed by the sensing unit as a preset motion for authorizing the data transfer,
sense, via the sensing unit, a motion of the body in a state where the display unit is turned off in response to an object being recognized via the transceiver, and
perform, via the transceiver, the data transfer with the object in the state where the display unit is turned off and the motion of the body sensed by the sensing unit matches the preset motion of the body authorizing the data transfer, the preset motion of the body including a motion pattern of the body of the mobile terminal,
wherein, when the preset motion is not sensed after a prescribed amount of time after the object is recognized, the controller generates a notification requesting the preset motion.

* * * * *